US006980299B1

(12) United States Patent
de Boer

(10) Patent No.: US 6,980,299 B1
(45) Date of Patent: Dec. 27, 2005

(54) SYSTEMS AND METHODS FOR IMAGING A SAMPLE

(75) Inventor: Johannes Fitzgerald de Boer, Somerville, MA (US)

(73) Assignee: General Hospital Corporation, Boston, MA (US)

( * ) Notice: Subject to any disclaimer, the term of this patent is extended or adjusted under 35 U.S.C. 154(b) by 260 days.

(21) Appl. No.: 10/272,171

(22) Filed: Oct. 16, 2002

Related U.S. Application Data

(60) Provisional application No. 60/329,842, filed on Oct. 16, 2001.

(51) Int. Cl.[7] ................................................. G01B 9/02
(52) U.S. Cl. ..................................................... 356/497
(58) Field of Search ................................ 356/479, 497

(56) References Cited

U.S. PATENT DOCUMENTS

| | | |
|---|---|---|
| 2,339,754 A | 1/1944 | Brace |
| 4,601,036 A | 7/1986 | Faxvog et al. |
| 4,631,498 A | 12/1986 | Cutler |
| 4,868,834 A | 9/1989 | Fox et al. |
| 4,925,302 A | 5/1990 | Cutler |
| 4,965,441 A | 10/1990 | Picard |
| 4,993,834 A | 2/1991 | Carlhoff et al. |
| 5,040,889 A | 8/1991 | Keane |
| 5,046,501 A | 9/1991 | Crilly |
| 5,120,953 A | 6/1992 | Harris |
| 5,197,470 A | 3/1993 | Helfer et al. |
| 5,293,872 A | 3/1994 | Alfano et al. |
| 5,317,389 A | 5/1994 | Hochberg et al. |
| 5,321,501 A | 6/1994 | Swanson et al. |
| 5,353,790 A | 10/1994 | Jacques et al. |
| 5,383,467 A | 1/1995 | Auer et al. |
| 5,419,323 A | 5/1995 | Kittrell et al. |
| 5,439,000 A | 8/1995 | Gunderson et al. |
| 5,441,053 A | 8/1995 | Lodder et al. |
| 5,459,570 A | 10/1995 | Swanson et al. |
| 5,465,147 A | 11/1995 | Swanson |

(Continued)

FOREIGN PATENT DOCUMENTS

| | | |
|---|---|---|
| DE | 4309056 | 9/1994 |

(Continued)

OTHER PUBLICATIONS

D. Huang et al., "Optical coherence tomography," *Science*, vol. 254, pp. 1178-1181, Nov. 1991.

(Continued)

*Primary Examiner*—Gregory J. Toatley, Jr.
*Assistant Examiner*—Michael A. Lyons
(74) *Attorney, Agent, or Firm*—Dorsey & Whitney LLP

(57) ABSTRACT

A system and method for imaging a sample are provided. In particular, a first combination of light and a second combination of light are received, in which a first cross correlation function is associated with the first combination and a second cross correlation function is associated with the second combination. Each of the first and the second combinations includes a first portion of light which is received from a reference arrangement and a second portion of light which is received from the sample, and a first relative position of the sample associated with the first combination is different than a second relative position of the sample associated with the second combination. In an exemplary embodiment of the present invention, the first cross correlation function is transformed into a first complex cross spectral density and the second cross correlation function is transformed into a second complex cross spectral density. Moreover, a third complex cross spectral density can be determined which is approximately an average of the first complex cross spectral density and the second complex cross spectral density.

79 Claims, 13 Drawing Sheets

U.S. PATENT DOCUMENTS

| | | | |
|---|---|---|---|
| 5,486,701 A | 1/1996 | Norton et al. | |
| 5,491,552 A | 2/1996 | Kittrell | |
| 5,562,100 A | 10/1996 | Kittrell et al. | |
| 5,583,342 A | 12/1996 | Ichie | |
| 5,590,660 A | 1/1997 | MacAulay et al. | |
| 5,601,087 A | 2/1997 | Gunderson et al. | |
| 5,697,373 A | 12/1997 | Richards-Kortum et al. | |
| 5,719,399 A | 2/1998 | Alfano et al. | |
| 5,748,598 A | 5/1998 | Swanson et al. | |
| 5,784,352 A | 7/1998 | Swanson et al. | |
| 5,795,295 A | 8/1998 | Hellmuth et al. | |
| 5,803,082 A | 9/1998 | Stapleton et al. | |
| 5,840,023 A | 11/1998 | Oraevsky et al. | |
| 5,842,995 A | 12/1998 | Mahadevan-Jansen et al. | |
| 5,865,754 A | 2/1999 | Sevick-Muraca et al. | |
| 5,871,449 A | 2/1999 | Brown | |
| 5,921,926 A | 7/1999 | Rolland et al. | |
| 5,956,355 A | 9/1999 | Swanson et al. | |
| 5,968,064 A | 10/1999 | Selmon et al. | |
| 5,987,346 A | 11/1999 | Benaron et al. | |
| 5,994,690 A | 11/1999 | Kulkarni et al. | |
| 6,002,480 A * | 12/1999 | Izatt et al. | 356/479 |
| 6,006,128 A | 12/1999 | Izatt et al. | |
| 6,010,449 A | 1/2000 | Selmon et al. | |
| 6,033,721 A | 3/2000 | Nassuphis | |
| 6,044,288 A | 3/2000 | Wake et al. | |
| 6,048,742 A | 4/2000 | Weyburne et al. | |
| 6,069,698 A | 5/2000 | Ozawa et al. | |
| 6,091,984 A | 7/2000 | Perelman et al. | |
| 6,111,645 A | 8/2000 | Tearney et al. | |
| 6,117,128 A | 9/2000 | Gregory | |
| 6,120,516 A | 9/2000 | Selmon et al. | |
| 6,134,003 A | 10/2000 | Tearney et al. | |
| 6,141,577 A | 10/2000 | Rolland et al. | |
| 6,151,522 A | 11/2000 | Alfano et al. | |
| 6,159,445 A | 12/2000 | Klaveness et al. | |
| 6,160,826 A | 12/2000 | Swanson et al. | |
| 6,161,031 A | 12/2000 | Hochman et al. | |
| 6,175,669 B1 | 1/2001 | Colston et al. | |
| 6,185,271 B1 | 2/2001 | Kinsinger | |
| 6,191,862 B1 | 2/2001 | Swanson et al. | |
| 6,201,989 B1 | 3/2001 | Whitehead et al. | |
| 6,208,887 B1 | 3/2001 | Clarke | |
| 6,282,011 B1 | 8/2001 | Tearney et al. | |
| 6,341,036 B1 | 1/2002 | Tearney et al. | |
| 6,377,349 B1 | 4/2002 | Fercher | |
| 6,421,164 B2 | 7/2002 | Tearney et al. | |
| 6,485,413 B1 | 11/2002 | Boppart et al. | |
| 6,485,482 B1 | 11/2002 | Belef | |
| 6,501,551 B1 | 12/2002 | Tearney et al. | |
| 6,552,796 B2 | 4/2003 | Magnin et al. | |
| 6,564,087 B1 | 5/2003 | Pitris et al. | |
| 6,622,732 B2 | 9/2003 | Constantz | |
| 6,685,885 B2 | 2/2004 | Nolte et al. | |
| 6,687,007 B1 | 2/2004 | Meigs | |
| 2002/0161357 A1 | 10/2002 | Rox et al. | |
| 2002/0163622 A1 | 11/2002 | Magnin et al. | |
| 2003/0023153 A1 | 1/2003 | Izatt et al. | |
| 2003/0026735 A1 | 2/2003 | Nolte et al. | |
| 2003/0236443 A1 | 12/2003 | Cespedes et al. | |
| 2004/0166593 A1 | 8/2004 | Nolte et al. | |

FOREIGN PATENT DOCUMENTS

| | | |
|---|---|---|
| EP | 0110201 | 6/1984 |
| EP | 0251062 | 1/1988 |
| GB | 2209221 | 5/1989 |
| WO | 9219930 | 11/1992 |
| WO | 9303672 | 4/1993 |
| WO | 9732182 | 9/1997 |
| WO | 9835203 | 8/1998 |
| WO | 9944089 | 9/1999 |
| WO | 9957507 | 11/1999 |
| WO | 0058766 | 10/2000 |
| WO | 0142735 | 6/2001 |
| WO | 0254027 | 7/2002 |
| WO | 03020119 | 3/2003 |

OTHER PUBLICATIONS

W. Drexler et al., "In vivo ultrahigh-resolution optical coherence tomography," *Opt. Lett.*, vol. 24, pp. 1221-1223, Sep. 1999.

G. J. Tearney et al., "High-speed phase- and group-delay scanning with a grating based phase control delay line," *Opt. Lett.*, vol. 22, pp. 1811-1813, Dec. 1997.

A. M. Rollins et al. "In vivo video rate optical coherence tomography," *Optics Express*, vol. 3, pp. 219-229, Sep. 1998.

C. E. Saxer et al., "High speed fiber-based polarization-sensitive optical coherence tomography of *in vivo* human skin," *Opt. Lett.*, vol. 25, pp. 1355-1357, Sep. 2000.

O. E. Martinez, "3000 times grating compressor with positive group velocity dispersion: Application to fiber compensation in 1.3-1.6 $\mu$m region," *IEEE J. Quantum Electron*, vol. 23, pp. 59-64, Jan. 1987.

M. D. Kulkarni et al., "Image enhancement in optical coherence tomography using deconvolution," *Electronics Letters*, vol. 33, pp. 1365-1367, Jul. 1997.

M. Bashkansky et al., "Signal processing for improving field cross-correlation function in optical coherence tomography," *Appl. Opt.*, vol. 37, pp. 8137-8138, Dec. 1998.

K. M. Yung et al., "Phase-domain processing of optical coherence tomography images," *Journal of Biomedical Optics*, vol. 4 pp. 125-136, Jan. 1999.

"High Resolution in Vivo Intra-Arterial Imaging with Optical Coherence Tomography" by Jujimoto et al., in the *Official Journal of the British Cardiac Society*, vol. 82, pp. 128-133 Heart-1999.

"In Vivo Endoscopic Optical Biopsy with Optical Coherence Tomography" by Tearney, et al., in the *SCIENCE*, vol. 276, Jun. 1997.

Nicusor V. Iftimia et al., "A Portable, Low Coherence Interferometry Based Instrument for Fine Needle Aspiration Biopsy Guidance" Accepted to Review of Scientific Instruments, 2005.

Abbas, G.L., V.W.S. Chan et al., "Local-Oscillator Excess-Noise Suppresion for Homodyne and Heterodyne-Detection", *Optics Letters*, vol. 8, pp. 419-421, Aug. 1983 issue.

Agrawal, G.P., "Population Pulsations and Nondegenerate 4-Wave Mixing in Semiconductor-Lasers and Amplifiers", *Journal Of The Optical Society Of America B-Optical Physics*, vol. 5, pp. 147-159, Jan. 1998.

Andretzky, P. et al., "Optical Coherence Tomography by Spectral Radar: Improvement of Signal-to-Noise Ratio", *The International Society for Optical Engineering, USA*, vol. 3915, 2000.

Ballif, J. et al., "Rapid and Scalable Scans at 21 m/s in optical Low-Coherence Reflectometry", *Optics Letters*, vol. 22, pp. 757-759, Jun. 1997.

Barfuss H. et al., "Modified Optical Frequency-Domain Reflectometry with High Spatial-Resolution for Components of Integrated Optic Systems", *Journal of Lightwave Technology*, vol. 7, pp. 3-10, Jan. 1989.

Beaud, P. et al., "Optical Reflectometry with Micrometer Resolution for the Investigation of Integrated Optical-Devices", *Leee Journal of Quantam Electronics*, vol. 25, pp. 755-759, Apr. 1989.

Bouma, Brett et al., "Power-Efficient Nonreciprocal Interferometer and Linear-Scanning Fiber-Optic Catheter for Optical Coherence Tomography", *Optics Letters*, vol. 24, pp. 531-533, Apr. 1999.

Brinkmeyer, E. et al., "Efficient Algorithm for Non-Equidistant Interpolation of Sampled Data", *Electronics Letters*, vol. 28, p. 693, Mar. 1992.

Brinkmeyer, E. et al., "High-Resolution OCDR in Dispersive Wave-Guides", *Electronics Letters*, vol. 26, pp. 413-414, Mar. 1990.

Chinn, S.R. et al., "Optical Coherence Tomography Using a Frequency-Tunable Optical Source", *Optics Letters*, vol. 22, pp. 340-342, Mar. 1997.

Danielson, B.L. et al., "Absolute Optical Ranging Using Low Coherence Interferometry", *Applied Optics*, vol. 30, p. 2975, Jul. 1991.

Dorrer, C. et al., "Spectral Resolution and Sampling Issues in Fourier-Transform Spectral Interferometry", *Journal of the Optical Society of America B-Optical Physics*, vol. 17, pp.1795-1802, Oct. 2000.

Dudley, J.M. et al., "Cross-Correlation Frequency Resolved Optical Gating Analysis of Broadband Continuum Generation in Photonic Crystal Fiber: Simulations and Experiments", *Optics Express*, vol. 10, p. 1215, Oct. 2002.

Eickhoff, W. et al., "Optical Frequency-Domain Reflectometry in Single-Mode Fiber", *Applied Physics Letters*, vol. 39, pp. 693-695, 1981.

Fercher, Adolf "Optical Coherence Tomography", *Jounrla of Biomedical Optics*, vol. 1, pp. 157-173, Apr. 1996.

Ferreira, L.A. et al., "Polarization-Insensitive Fiberoptic White-Light Interferometry", *Optics Communications*, vol. 114, pp. 386-392, Feb. 1995.

Fujii, Yohji, "High-Isolation Polarization-Independent Optical Ciruclator", *Journal of Lightwave Technology*, vol. 9, pp. 1239-1243, Oct. 1991.

Glance, B., "Polarization Independent Coherent Optical Receiver", *Journal of Lightwave Technology*, vol. LT-5, p. 274, Feb. 1987.

Glombitza, U., "Coherent Frequency-Domain Reflectometry for Characterization of Single-Mode Integrated-Optical Wave-Guides", *Journal of Lightwave Technology*, vol. 11, pp. 1377-1384, Aug. 1993.

Golubovic, B. et al., "Optical Frequency-Domain Reflectometry Using Rapid Wavelength Tuning of a Cr4+: Forsterite Laser", *Optics Letters*, vol. 11, pp. 1704-1706, Nov. 1997.

Haberland, U. H. P. et al., "Chirp Optical Coherence Tomography of Layered Scattering Media", *Journal of Biomedical Optics*, vol. 3, pp. 259-266, Jul. 1998.

Hammer, Daniel X. et al., "Spectrally Resolved White-Light Interferometry for Measurement of Ocular Dispersion", *Journal of the Optical Society of America A-Optics Image Science and Vision*, vol. 16, pp. 2092-2102, Sep. 1999.

Harvey, K. C. et al., "External-Cavity Diode-Laser Using a Grazing-Incidence Diffraction Grating", *Optics Letters*, vol. 16, pp. 910-912, Jun. 1991.

Hausler, Gerd et al., " 'Coherence Radar∝ and 'Spectral Radar∝ New Tools for Dermatological Diagnosis", *Journal of Biomedical Optics*, vol., 3, pp. 21-31, Jan. 1998.

Hee, Michael R. et al., "Polarization-Sensitive Low-Coherence Reflectometer for Birefringence Characterization and Ranging", *Journal of the Optical Society of America B (Optical Physics)*, vol. 9, pp. 903-908, Jun. 1992.

Hotate Kazuo et al., "Optical Coherence Domain Reflectometry by Synthesis of Coherence Function", *Journal of Lightwave Technology*, vol. 11, pp. 1701-1710, Oct. 1993.

Inoue, Kyo et al., "Nearly Degenerate 4-Wave-Mixing in a Traveling-Wave Semiconductor-Laser Amplifier", *Applied Physics Letters*, vol. 51, pp. 1051-1053, 1987.

Ivanov, A. P. et al., "New Method for High-Range Resolution Measurements of Light Scattering in Optically Dense Inhomogeneous Media", *Optics Letters*, vol. 1, pp. 226-228, Dec. 1977.

Ivanov, A. P. et al., "Interferometric Study of the Spatial Structure of a Light-Scattering Medium", *Journal of Applied Spectroscopy*, vol. 28, pp. 518-525, 1978.

Kazovsky, L. G. et al., "Heterodyne Detection Through Rain, Snow, and Turbid Media: Effective Receiver Size at Optical Through Millimeter Wavelenghths", *Applied Optics*, vol. 22, pp. 706-710, Mar. 1983.

Kersey, A. D. et al., "Adaptive Polarization Diversity Receiver Configuration for Coherent Optical Fiber Communcations", *Electronics Letters*, vol. 25, pp. 275-277, Feb. 1989.

Kohlhaas, Andreas et al., "High-Resolution OCDR for Testing Integrated-Optical Waveguides: Dispersion-Corrupted Experimental Data Corrected by a Numerical Algorithm", *Journal of Lightwave Technology*, vol. 9, pp. 1493-1502, Nov. 1991.

Larkin, Kieran G., "Efficient Nonlinear Algorithm for Envelope Detection in White Light Interferometry", *Journal of the Optical Society of America A-Optics Image Science and Vision*, vol. 13, pp. 832-843, Apr. 1996.

Leitgab, R. et al., "Spectral measurement of Absorption by Spectroscopic Frequency-Domain Optical Coherence Tomography", *Optics Letters*, vol. 25, pp. 820-822, Jun. 2000.

Lexer, F. et al., "Wavelength-Tuning Interferometry of Intraocular Distances", *Applied Optics*, vol. 36, pp. 6548-6553, Sep. 1997.

Mitsui, Takahisa, "Dynamic Range of Optical Reflectometry with Spectral Interferometry", *Japanese Journal of Applied Physics Part 1-Regular Papers Short Notes & Review Papers*, vol. 38, pp. 6133-6137, 1999.

Naganuma, Kazunori et al., "Group-Delay Measurement Using the Fourier-Transform of an Interferometric Cross-Correlation Generated by White Light", *Optics Letters*, vol. 15, pp. 393-395, Apr. 1990.

Okoshi, Takanori, "Polarization-State Control Schemes for Heterodyne or Homodyne Optical Fiber Communications", *Journal of Lightwave Technology*, vol. LT-3, pp. 1232-1237, Dec. 1995.

Passy, R. et al., "Experimental and Theoretical Investigations of Coherent OFDR with Semiconductor-Laser Sources", *Journal of Lightwave Technology*, vol. 12, pp. 1622-1630, Sep. 1994.

Podoleanu, Adrian G., "Unbalanced Versus Balanced Operation in an Optical Coherence Tomography System", *Applied Optics*, vol. 39, pp. 173-182, Jan. 2000.

Price, J. H. V. et al., "Tunable, Femtosecond Pulse Source Operating in the Range 1.06-1.33 mu m Based on an Yb3+-doped Holey Fiber Amplifier", *Journal of the Optical Society of America B-Optical Physics*, vol. 19, pp. 1286-1294, Jun. 2002.

Schmitt, J. M. et al, "Measurement of Optical-Properties O Biological Tissues By Low-Coherence Reflectometry" *Applied Optics*, vol. 32, pp. 6032-6042, Oct. 1993.

Silberberg, Y. et al., "Passive-Mode Locking of a Semiconductor Diode-Laser", *Optics Letters,* vol. 9, pp. 507-509, Nov. 1984.

Smith, L. Montgomery et al., "Absolute Displacement Measurements Using Modulation of the Spectrum of White-Light in a Michelson Interferometer", *Applied Optics,* vol. 28, pp. 3339-3342, Aug. 1989.

Sonnenschein, C. M. et al., "Signal-To-Noise Relationships for Coaxial Systems that Heterodyne Backscatter from Atmosphere", *Applied Optics,* vol. 10, pp. 1600-1604, Jul. 1971.

Sorin, W.V. et al., "Measurement of Rayleigh Backscattering at 1.55 mu m with 32 mu m Spatial Resolution", *IEEE Photonics Technology Letters,* vol. 4, pp. 374-376, Apr. 1992.

Sorin, W.V. et al., "A Simple Intensity Noise-Reduction Technique for Optical Low-Coherence Reflectometry", *IEEE Photonics Technology Letters,* vol. 4, pp. 1404-1406, Dec. 1992.

Swanson, E. A. et al., "High-Speed Optical Coherence Domair Reflectometry", *Optics Letters,* vol. 17, pp. 151-153, Jan. 1992.

Takada, K. et al., "High-Resolution OFDR with Incorporated Fiberoptic Frequency Encoder", *IEEE Photonics Technology Letters,* vol. 4, pp. 1069-1072, Sep. 1992.

"Narrow-Band light Source with Acoustooptic Tunable Filter for Optical Low-Coherence Reflectometry", by Takada, Kazumasa et al., *IEEE Photonics Technology Letters,* vol. 8, pp. 658-660, May, 1996.

Takada, Kazumasa et al., "New Measurement System for Fault Location in Optical Wave-Guide Devices Based on an Interometric-Technique", *Applied Optics,* vol. 26, pp. 1603-1606, Mar. 1987.

Tateda, Mitsuhiro et al., "Interferometric Method for Chromatic Dispersion Measurement in a Single-Mode Optical Fiber", *IEEE Journal of Quantam Electronics,* vol. 17, pp. 404-407, Mar. 1981.

Toide, M. et al., "Two-Dimensional Coherent Detection Imaging in Multiple Scattering Media Based the Directional Resolution Capability of the Optical Heterodyne Method", *Applied Physics B (Photophysics and Laser Chemistry),* vol. B52, pp. 391-394, 1991.

Trutna, W. R. et al., "Continuously Tuned External-Cavity Semiconductor-Laser", *Journal of Lightwave Technology,* vol. 11, pp. 1279-1286, Aug. 1993.

Uttam, Deepak et al., "Precision Time Domain Reflectometry in Optical Fiber Systems Using a Frequency Modulated Continuous Wave Ranging Technique", Journal of *Lightwave Technology,* vol. 3, pp. 971-977, Oct. 1985.

Von Der Weid, J. P. et al., "On the Characterization of Optical Fiber Network Components with Optical Frequency Domain Reflectometry", Journal of *Lightwave Technology,* vol. 15, pp. 1131-1141, Jul. 1997.

Wysocki, P.F. et al., "Broad-Spectrum, Wavelength-Swept, Erbium-Doped Fiber Laser at 1.55-Mu-M", *Optics Letters,* vol. 15, pp. 879-881, Aug. 1990.

Youngquist, Robert C. et al., "Optical Coherence-Domain Reflectometry — A New Optical Evaluation Technique", *Optics Letters,* vol. 12, pp. 158-160, Mar. 1987.

Yun, S. H. et al., "Wavelength-Swept Fiber Laser with Frequency Shifted Feedback and Resonantly Swept Intra-Cavity Acoustooptic Tunable Filter", *IEEE Journal of Selected Topics in Quantam Electronics,* vol. 3, pp. 1087-1096, Aug. 1998.

Yun, S. H. et al., "Interrogation of Fiber Grating Sensor Arrays with a Wavelength-Swept Fiber Laser", *Optics Letters,* vol. 23, pp. 843-845, Jun. 1998.

Yung, K. M., "Phase-Domain Processing of Optical Coherence Tomography Images", *Journal of Biomedical Optics,* vol. 4, pp. 125-136, Jan. 1999.

Zhou, Xiao-Qun et al., "Extended-Range FMCW Reflectometry Using an optical Loop with a Frequency Shifter", *IEEE Photonics Technology Letters,* vol. 8, pp. 248-250, Feb. 1996.

Zorabedian, Paul et al., "Tuning Fidelity of Acoustooptically Controlled External Cavity Semiconductor-Lasers", *Journal of Lightwave Technology,* vol. 13, pp. 62-66, Jan. 1995.

Victor S. Y. Lin et al., "A Porous Silicon-Based Optical Interferometric Biosensor", *Science,* vol. 278, pp. 840-843, Oct. 31, 1997

* cited by examiner

SYSTEMS AND METHODS FOR IMAGING A SAMPLE

CROSS-REFERENCE TO RELATED APPLICATION

The present application claims priority from U.S. Provisional Patent Application No. 60/329,842 filed Oct. 16, 2001, entitled "Method and System for Processing of Data Related to Optical Coherence Tomography Signals," the disclosure of which is incorporated herein by reference in its entirety.

FIELD OF THE INVENTION

The present invention generally relates to systems and methods for imaging a sample by processing optical coherence tomography (OCT) signals. In particular, the present invention is directed to systems and methods for imaging a sample in which OCT signals are processed to modify a spectral shape of a source of light and/or compensate for a dispersion between a portion of the light transmitted to the sample and a portion of the light transmitted to a reference arrangement. The systems and method of the present invention can also implement a demodulation algorithm to extract intensity, polarization and/or Doppler shift information from the OCT signals.

BACKGROUND OF THE INVENTION

Optical coherence tomography (OCT) is non-invasive imaging technique capable of performing high-resolution, two-dimensional cross-sectional imaging of samples, such as microstructures in biological structures (e.g., human tissue, such as an eye). Specifically, OCT arrangements can use a source (e.g., a light source) having a particular coherence length (e.g., between about 1 micron and about 1 meter). For example, an interferometer may be used with such arrangement, such as a Michelson interferometer, a Mach Zehnder interferometer, etc. In this configuration, light from the source is routed through a fiber. This light enters a fiberoptic coupler (e.g., a beam splitter), and the fiberoptic coupler divides the light into two portions (e.g., equal portions). After the light is divided, a first portion of the light is transmitted towards a reference arrangement (e.g., a reflective arrangement such as a mirror) via a reflective arm having a variable length, and a second portion of the light is transmitted towards the sample via a sample arm having a constant length. Moreover, the first and second portions of light return or reflect from the reference arrangement and the sample, respectively, and recombine within the fiberoptic coupler. The recombined light is then transmitted to a detector. Further, the detector is coupled to a computer arrangement which extracts information from the signal received from the detector. Specifically, this information is associated with interference fringes of light from the sample and the reference arrangement to generate an image of the sample.

Nevertheless, in such OCT system, the interference fringes are only formed when the distance propagated by the first portion of light matches the distance propagated by the second portion of light within the coherence length of the source. Therefore, when the length of the reference arm increases from a particular length to a further length, and the length of the sample arm remains constant, the detected light will be such light which is propagated further into the sample than when the length of the reference arm has the particular length. Consequently, by adjusting the length of the reference arm to detect a plurality of signals, substantially the entire sample may be imaged.

Ideally, the source used in this OCT system has a Gaussian spectrum. However, sources having Gaussian structures are difficult to manufacture, and many readily available sources have non-Gaussian structures. However, sources having non-Gaussian spectrums may generate side lobes in a coherence envelope of the interference pattern, which can generate spurious structures within the image of the sample. Consequently, portions of the image may be unclear.

SUMMARY OF THE INVENTION

Therefore, a need has arisen to provide systems and methods for imaging which overcome the above-described and other shortcomings of the prior art.

One of the advantages of the present invention is that OCT signals can be processed to modify the spectral shape of a source having a non-Gaussian spectrum, such that the side lobes in the coherence envelope are reduced or eliminated. Another advantage of the present invention is that the OCT signals can be processed to compensate for the dispersion between the light which is transmitted to the reference arrangement and the light which is transmitted to the sample. Yet another advantage of the present invention is that the OCT signals can be processed to implement a demodulation algorithm for extracting intensity, polarization and/or Doppler shift information from the OCT signals.

These and other advantages can be achieved with the system and method according to exemplary embodiments of the present invention. With this system and method for imaging the sample, a first combination of light and a second combination of light are received (e.g., by a detector), in which a first cross-correlation function is associated with the first combination and a second cross correlation function is associated with the second combination. Each of the first and the second combinations include a first portion of light which is received from a reference arrangement (e.g., a reflective arrangement, such as a mirror) and a second portion of light which is received from the sample (e.g., a microstructure in biological structure, such as tissue in a human). Moreover, a first relative position of the sample associated with the first combination is different than a second relative position of the sample associated with the second combination.

For example, the first combination of light (e.g., first beam of light) can be transmitted from a source to a fiberoptic coupler (e.g., a beam splitter), and the fiberoptic coupler can divide the first combination of light into the first portion of light and the second portion of light. The first portion of the first combination can be transmitted to the reference arrangement, and the second portion of the first combination can be transmitted to the sample. Also, the first portion of the first combination may reflect off of the reference arrangement and return to the fiberoptic coupler, and the second portion of the first combination may reflect off of the sample and return to the fiberoptic coupler, such that the first portion of the first combination and the second portion of the first combination are recombined at the fiberoptic coupler. In particular, during the transmission of the first combination, a distance between the fiberoptic coupler and the reference arrangement can be altered (e.g., by about 2 mm). The first combination is then transmitted to a detector, and a computer arrangement coupled to the detector may receive a signal or signals associated with the first combination.

After the computer arrangement receives the signal associated with the first combination, a position of the source and/or a position of the sample can be altered (i.e., the relative position of the sample can be altered), and the second combination of light (e.g., second beam of light) can be transmitted from the source to the fiberoptic coupler. For example, the source and/or the sample can be moved in the X, Y, and/or Z direction. The fiberoptic coupler can divide the second combination of light into the first portion of light and the second portion of light. Further, the first portion of the second combination can be transmitted to the reference arrangement, and the second portion of the second combination can be transmitted to the sample. Also, the first portion of the second combination may reflect off of the reference arrangement and return to the fiberoptic coupler, and the second portion of the second combination may reflect off of the sample and return to the fiberoptic coupler, such that the first portion of the second combination and the second portion of the second combination are recombined at the fiberoptic coupler. In particular, during the transmission of the second combination, the distance between the fiberoptic coupler and the reference arrangement can be altered (e.g., by about 2 mm). For example, the distance between the fiberoptic coupler and the reference arrangement can be altered in the same manner as during the transmission of the first combination. The second combination is then transmitted to the detector, and the computer arrangement may receive a signal or signals associated with the second combination. This may continue for a predetermined number of combinations of light (e.g., any number of combinations of light greater than one combination which are sufficient to image the sample).

In another exemplary embodiment of the present invention, to modify the spectral shape of the source (i.e., a source having a non-Gaussian spectrum), the first cross correlation function can be transformed (e.g., using a Fourier transform) into a first complex cross spectral density, and the second cross correlation function can be transformed (e.g., using a Fourier transform) into a second complex cross spectral density. Moreover, a third complex cross spectral density can be determined which is approximately an average of the first complex cross spectral density and the second complex cross spectral density, and a particular (e.g., desired) width of a Gaussian spectra of the source can be determined based on the third complex cross spectral density. For example, an area, average amplitude, and width of the third complex cross spectral density can be determined, and the particular width can be determined based on the area, the average amplitude, and the width of the third complex cross spectral density.

In addition, a correction curve can be determined based on a ratio between the Gaussian spectra and the third complex cross spectral density, and the first complex cross spectral density and the second complex cross spectral density can be modified as a function of the correction curve. For example, the first complex cross spectral density can be multiplied by the correction curve in order to obtain a first modified complex cross spectral density, and the second complex cross spectral density can be multiplied by the correction curve in order to obtain a second modified complex cross spectral density. The first modified complex cross spectral density can then be transformed (e.g., using an inverse Fourier transform) into a first modified cross correlation function, and the second modified complex cross spectral density can be transformed (e.g., using an inverse Fourier transform) into a second modified cross correlation function. Moreover, a coherence function envelope of the sample can be determined based on the first modified cross correlation function and the second modified cross correlation function.

In yet another exemplary embodiment of the present invention, to compensate for dispersion between the light which is transmitted to the reference arrangement (i.e., the first portion of the light) and the light which is transmitted to the sample (i.e., the second portion of the light), the first cross correlation function can be transformed (e.g., using a Fourier transform) into the first complex cross spectral density and the second cross correlation function can be transformed (e.g., using a Fourier transform) into the second complex cross spectral density. Moreover, the first complex cross spectral density can be modified to implement a phase shift of the first complex cross spectral density, and/or the second complex cross spectral density can be modified in order to implement a phase shift of the second complex cross spectral density. For example, the first complex cross spectral density and/or the second complex cross spectral density can be multiplied by a predetermined factor to obtain a first modified complex cross spectral density and/or a second modified complex cross spectral density, respectively, and the predetermined factor can include a particular quadratic phase shifting term.

Further, an image of the sample can be generated based on the first cross correlation function and/or the second cross correlation function, and an average variance associated with the image of the sample can be determined. Moreover, the first modified complex cross spectral density can be transformed (e.g., using an inverse Fourier transform) into a third cross correlation function and/or the second modified complex cross spectral density can be transformed (e.g., using an inverse Fourier transform) into a fourth cross correlation function. Then, a modified image of the sample can be generated based on the third cross correlation function and/or the fourth cross correlation function, and an average variance associated with the modified image of the sample can be determined. The particular quadratic phase shifting term can then be iteratively altered in order to generate additional modified images of the sample until the average variance associated with the image of the sample is maximized. It will be understood by those of ordinary skill in the art that the second exemplary embodiment of the present invention can be used in combination with, or independent of, the first exemplary embodiment of the present invention.

In still another exemplary embodiment of the present invention, it is possible to reduce a bandwidth range over which the Fourier transforms and the inverse Fourier transforms are performed in the exemplary embodiments of the present invention. This can be accomplished by modifying the first cross correlation function (e.g., by multiplying it by a particular factor, such as $e^{i2kz}$) to obtain a first modified cross correlation function, and/or modifying the second cross correlation function (e.g., by multiplying it by the particular factor) to obtain a second modified cross correlation function. Further, an average of the first modified cross correlation function and/or an average of the second modified cross correlation function may be determined over a first frequency range (e.g., between about −200 Hz and about 200 Hz) which is different than a second frequency range (e.g., between about 600 Hz and about 1000 Hz) of the first cross correlation function and/or the second cross correlation function. Also, the first modified cross correlation function and/or the second modified cross correlation function can be transformed into a first complex cross spectral density and/or a second complex cross spectral density, respectively. Then, the exemplary embodiments of the present invention may be performed at a reduced bandwidth range.

In a further exemplary embodiment of the present invention, to reduce a bandwidth range over which the Fourier transforms and the inverse Fourier transforms can be performed in the first and second exemplary embodiments of the present invention, the first cross correlation function may be transformed into a first complex cross spectral density, and/or the second cross correlation function may be transformed into a second complex cross spectral density. Further, a frequency range of the first complex cross spectral density and/or the second complex cross spectral density can be modified or shifted from a first frequency range (e.g., between about 600 Hz and about 1000 Hz) to a second frequency range (e.g., between about − 200 Hz and about 200 Hz). Then, the exemplary embodiments of the present invention may be performed at a reduced bandwidth range.

DETAILED DESCRIPTION

Exemplary embodiments of the present invention and their advantages may be understood by referring to FIGS. 1–13, like numerals being used for like corresponding parts in the various drawings.

Figure 1:
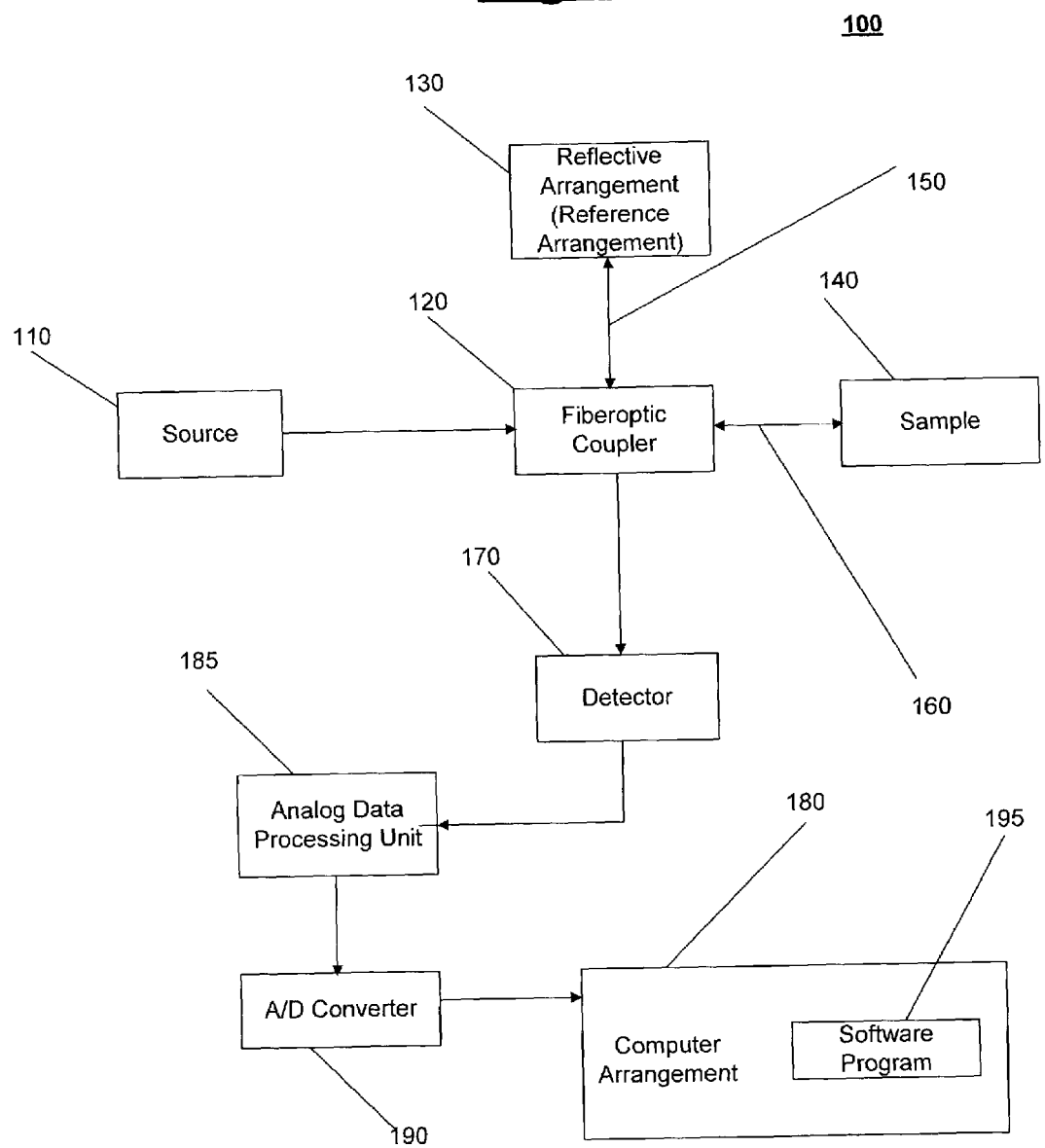
FIG. 1 is a schematic diagram of a first exemplary embodiment of a system according to the present invention for imaging a sample.

Referring to FIG. 1, an exemplary first embodiment of a system 100 for imaging a sample is illustrated. The system 100 (e.g., a system 100 based on a Michelson or a Mach Zehnder interferometer) can include a source 110 coupled to a fiberoptic coupler 120 (e.g., a beam splitter). The system 100 also may include a reference arrangement (e.g., a reflective arrangement 130 such as a mirror, a delay arrangement 130' of FIG. 2, etc.) and a sample 140 (e.g., a microstructure in biological structure, such as tissue in a human). A path between the fiberoptic coupler 120 and the reflective arrangement 130 may be defined as a reference arm 150, and a path between the fiberoptic coupler 120 and the sample 140 may be defined as a sample arm 160.

The system 100 can also include a detector 170, and a computer arrangement 180 coupled to the detector 170. For example, the computer arrangement 180 can be coupled to the detector 170 via an analog data processing unit 185 and/or an A/D converter 190. Moreover, a software program 195 may be executed by the computer arrangement 180 when this computer arrangement 180 receives signals (e.g., data) from the detector 170 to extract desired information from the signals, such as structural images, polarization images and flow images. Specifically, the computer arrangement 180 can be configured to modify the spectral shape of the source 110 (i.e., having a non-Gaussian spectrum), compensate for dispersion between the light which is transmitted to the reflective arrangement 130 and the light which is transmitted to the sample 140, and/or reduce a bandwidth range over which Fourier transforms and inverse Fourier transforms are performed by the software program 195.

For example, a first combination of beam of light (not shown) can be transmitted from the source 110 to the fiberoptic coupler 120, and the fiberoptic coupler 120 can divide the first beam of light into a first portion of light and a second portion of light. The first portion can be transmitted to the reflective arrangement 130, and the second portion can be transmitted to the sample 140. Moreover, the first portion may reflect off of the reflective arrangement 130 and return to the fiberoptic coupler 120, and the second portion may reflect off of the sample 140 and return to the fiberoptic coupler 120. In this manner, the first portion and the second portion are recombined at the fiberoptic coupler 120. In particular, during the transmission of the first combination, the distance between the fiberoptic coupler and the reference arrangement can be altered (e.g., by about 2 mm). The recombined first beam of light is then transmitted to the detector 170, and the computer arrangement 180 receives a signal or signals associated with the first beam of light. After the computer arrangement 180 receives the signal associated with the first beam of light, the position of the source 110 and/or the position of the sample 140 can be altered (i.e., the relative position of the sample 140 can be altered), and the second combination or beam of light can be transmitted from the source 110 to the fiberoptic coupler 120. For example, the source 110 and/or the sample 140 can be moved in the X, Y, and/or Z direction. The process may be repeated until a predetermined number of signals are received by the computer arrangement 180 (e.g., a number of signals sufficient to allow the computer arrangement 180 to generate an image of the sample 140).

Figure 2:
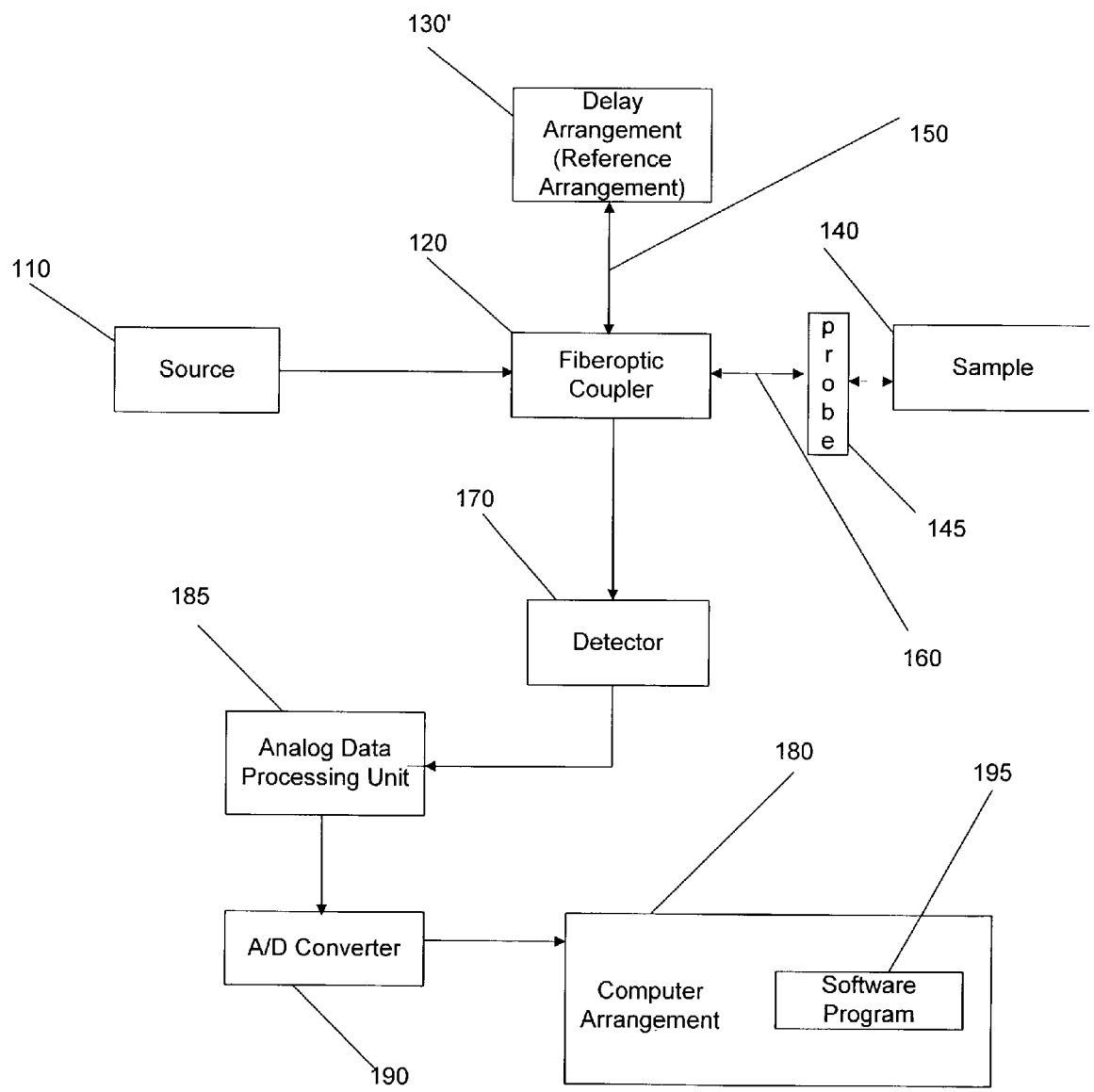
FIG. 2 is a schematic diagram of a second exemplary embodiment of a system according to the present invention for imaging the sample.

Referring to FIG. 2, a second exemplary embodiment of the system 100 for imaging the sample is illustrated. The features and advantages of the second embodiment system 100 are substantially similar to the features and advantages of the first exemplary embodiment of the system 100 except as indicated below. Therefore, the similar features and advantages of the first embodiment are not discussed further with respect to the second embodiment. In the second exemplary embodiment of the system according to the present invention, system 100 also includes a probe 145 positioned between the fiberoptic coupler 120 and the sample 140. The probe 145 may be scanned over the sample 140 to generate two or three dimensional data. Moreover, the reflective arrangement 130 may be replaced by the delay arrangement 130'.

I. Modification of the Spectral Shape of the Source

Described below is an exemplary digital spectral shaping technique to reduce the side lobes (e.g., ringing) of the axial point spread function in Optical Coherence Tomography for non-Gaussian shaped source spectra, according to the present invention.

A temporal coherence or, equivalently, the source spectral bandwidth may control the axial point spread function that determines the depth of the microstructure. To increase axial resolution, several methods can be used to generate light with low temporal and high spatial coherence. In virtually all of these techniques, special care should be taken to generate spectral shapes that resemble a Gaussian profile. Non-Gaussian spectral shapes would result in side lobes in the coherence envelope that generate spurious structures in the OCT images. Many sources that can be used for OCT do not have Gaussian spectra (e.g., Erbium doped fiber amplifiers or self phase modulated spectral broadening of short pulses in microstructure fibers), thus possibly requiring some form of spectral filtering or shaping of the source spectrum into a more Gaussian form. These problems can be addressed by a signal processing technique described in greater detail below without a significant signal-to-noise penalty.

In the OCT system according to the present invention, the coherence function can be proportional to the real part of the Fourier transform of the source spectrum S(k), such that $$R(\Delta z) \propto Re \int exp(i2k\Delta z) S(k) dk, \quad (1)$$

with $k=2\pi/\lambda$ being the free space wave number, and $\Delta z=z-z'$ being the path length difference between reference and sample waves, respectively. R(z) is preferably the interference part of the signal detected at the photo detectors. The intensity I(z) back-scattered from the sample arm is preferably proportional to the square of R(z), $I(z) \propto R^2(z)$. For a Gaussian source with spectral full width at half maximum (FWHM) $\Delta\lambda$ centered at $\lambda_0$, the FWHM of the coherence envelope is given by the equation $$l_c = \frac{2\lambda_0^2 \ln 2}{\pi \Delta \lambda}.$$

The spectral-shaping technique shapes the source spectrum by Fourier transforming the interferometric signal in Equation 1, then applying a correction to each Fourier component such that the spectrum becomes Gaussian. After an inverse transform, the ideal coherence function for a Gaussian source spectrum can be obtained.

Figure 9:
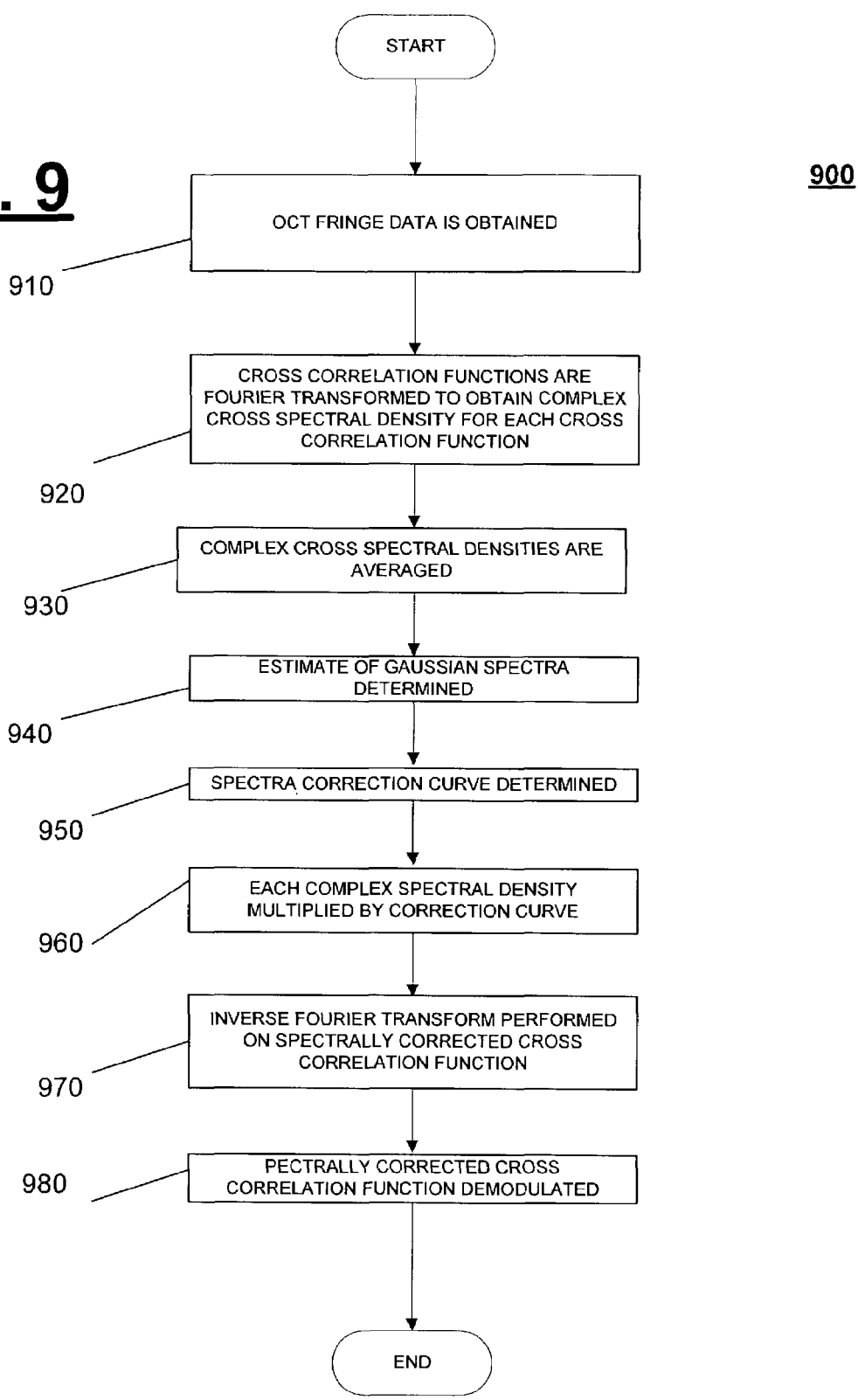
FIG. 9 is a flow diagram of a first exemplary embodiment of a method according to the present invention for imaging the sample.

Referring to FIG. 9, a first exemplary embodiment of a method 900 for modifying the spectral shape of the source 110 in order to image the sample 140 is illustrated. In step 910, OCT fringe data for an image can be obtained, which consists of obtaining a plurality of cross correlation functions R(z) at different locations within the sample 140. In step 920, the cross correlation functions are Fourier transformed to a obtain complex cross spectral density for each cross correlation function: R(z)–>S(k). In step 930, |S(k)| is averaged to obtain <|S(k)|> over many (e.g., more than one) depth profiles (A-lines) to average out the specific structure on |S(k)| that is related to sample structure.

In step 940, the averaged spectral density <|S(k)|> can be used to obtain an estimate for Gaussian function, e.g., by calculating the zero'th, first and second moment. To improve the accuracy of the zero'th, first and second moment, the noise component to |S(k)| can be subtracted first. The noise component can be estimated by assuming a white noise spectrum, and subtracting a constant from the spectral density |S(k)| with the requirement that |S(k)|-constant is never negative. Alternatively, the noise component may be estimated by performing a measurement R(z) with the sample arm blocked, thus obtaining an estimate of the sum of the electronic noise spectrum, shot noise spectrum, source noise spectrum and other noise sources. In step 950, a spectra correction curve SC(k) can be determined by taking the ratio of Gaussian and averaged spectral density <|S(k)|>.

In step 960 of FIG. 9, each complex spectral density S(k) can be multiplied by the spectral correction curve SC(k) to obtain the spectrally corrected complex spectral density. In step 970, an inverse Fourier transform may be performed on the spectrally corrected complex spectral density to obtain the spectrally corrected cross correlation function. Moreover, in step 980, the spectrally corrected cross correlation function can be demodulated to obtain structural information of depth profile (A-line). This structural information would likely have reduced side lobes due to the reshaping of the spectrum into a more Gaussian form. Optionally, the noise penalty and the variance of the demodulated depth profile can be analyzed to adapt the spectral filter by adapting the zero'th, first and second moment of the Gaussian fit to improve image quality. Once the optimal correction curve can be found for a particular measurement environment (e.g., system configuration, target, application or patient), the correction can be applied immediately without the iterative procedure.

Figure 3:
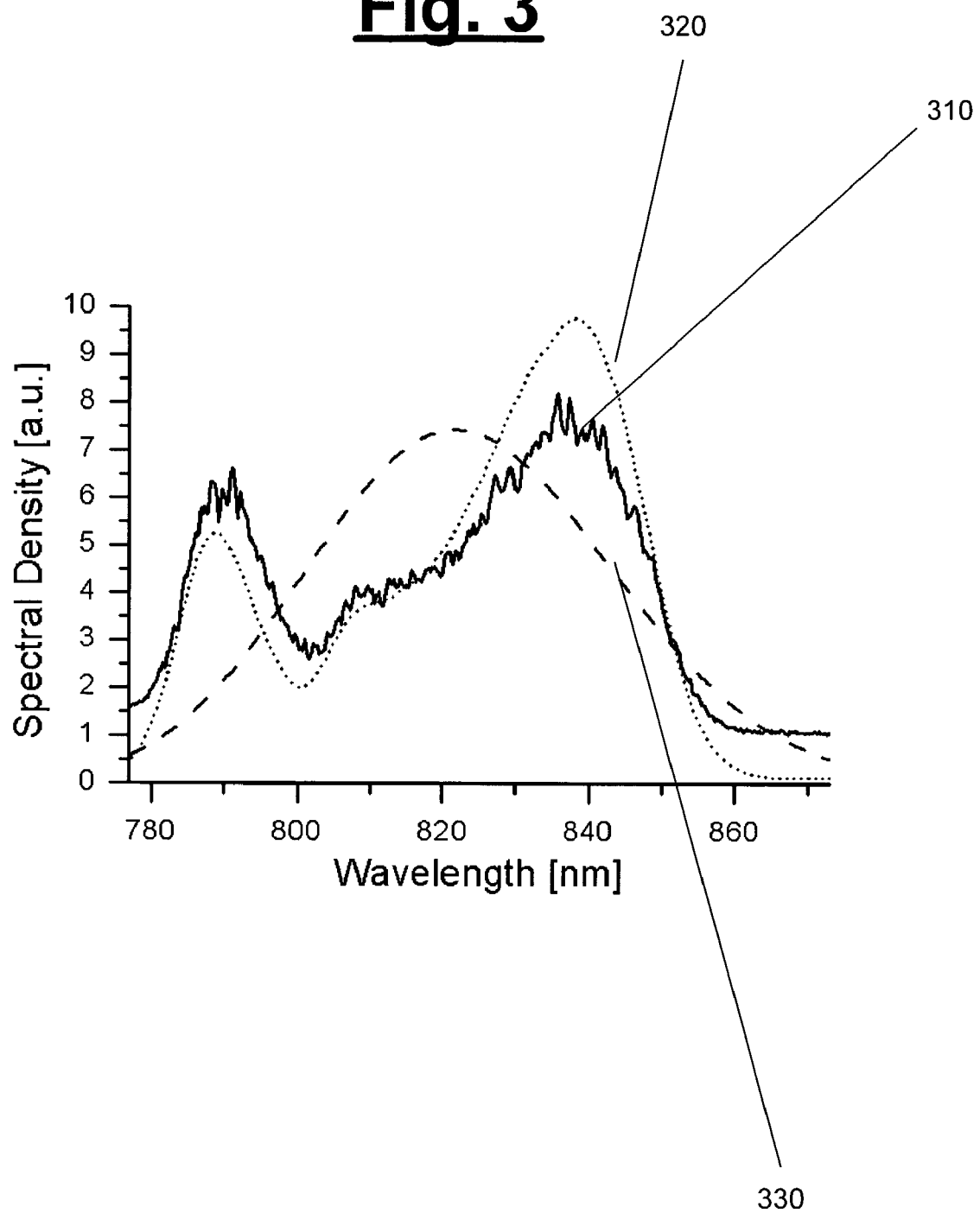
FIG. 3 is a graph depicting an ideal Gaussian spectrum, a spectrum for a non-Gaussian source, and a Gaussian fit for the spectrum of the non-Gaussian source according to an exemplary embodiment of the present invention.

FIG. 3 depicts an exemplary spectrum 310 which can be calculated from the average of the square root of the power spectrum of 500 A-lines (10,000 samples per A-line, zero padded to 16,384) by Fourier-transforming the interferometric responses to a single surface. The dashed curve 320 is a Gaussian fit to the spectrum 310, determined by the zero'th, first and second moments of the spectral density. The center wavelength and FWHM of the ideal Gaussian 330 are preferably 823 nm and 49 nm, respectively. The ratio of the Gaussian fit 320 and measured spectral density define a spectral correction curve SC($\lambda$), or equivalently SC(k). The spectrally filtered response of each depth profile can be obtained by Fourier-transforming each individual depth profile, multiplying the resulting spectrum with SC(k), and performing the inverse transform thereon.

Figure 4:
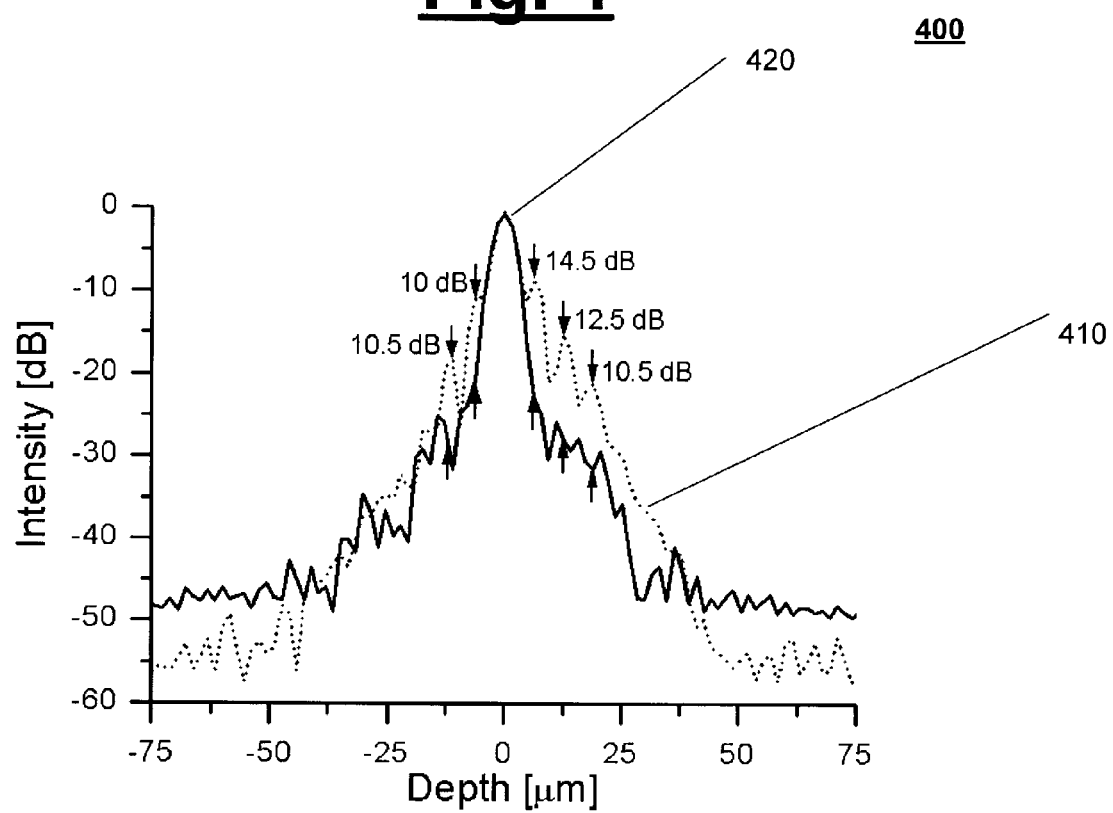
FIG. 4 is a graph depicting an unmodified coherence envelope with side lobes, and a modified coherence envelope with reduced side lobes according to an exemplary embodiment of the present invention.

FIG. 4 shows an exemplary illustration of a coherence function envelope 400 which can be obtained by digital quadrature demodulation with a spatial resolution of 1.6 $\mu$m. In FIG. 4, an unmodified coherence envelope 410 is provided before spectral shaping for a single surface (glass slide), and a modified coherence envelope 420 with side lobe reduction at specific locations is also shown. The increase in the noise floor far from the coherence envelope 400 is approximately 8.5 dB, and the FWHM of the coherence envelope is approximately 6.0–6.5 µm. The distance can be calibrated using the front and back reflection from a 1 mm thick microscope slide with refractive index of, e.g., 1.5.

To demonstrate that spectral shaping is not only feasible for (e.g., highly) reflective single surfaces, but that it also actually improves images of biological structures, it is possible to image a section of e.g., an onion skin. For example, a total of 6 images can then be acquired at the same location. Each image may take approximately 1 second to be acquired, scanning a width of 1 mm, and each image is preferably processed both without and with spectral shaping. The spectral density can be determined from the image data itself by calculating the square root of the power spectrum for each individual A-line in the image and averaging over all A-lines (500). To obtain the Gaussian fit, the zero'th moment (the area) of the spectral density can be calculated. For the first moment (e.g., the mean) and for the second moment (e.g., the width), the values determined from the glass slide measurement are preferably utilized. The spectral correction curve can be calculated independently for each image from the Gaussian fit and the spectral density. The image spectra are scaled vertically such that the Gaussian fits to the image and glass slide spectra exactly overlap.

Figure 5:
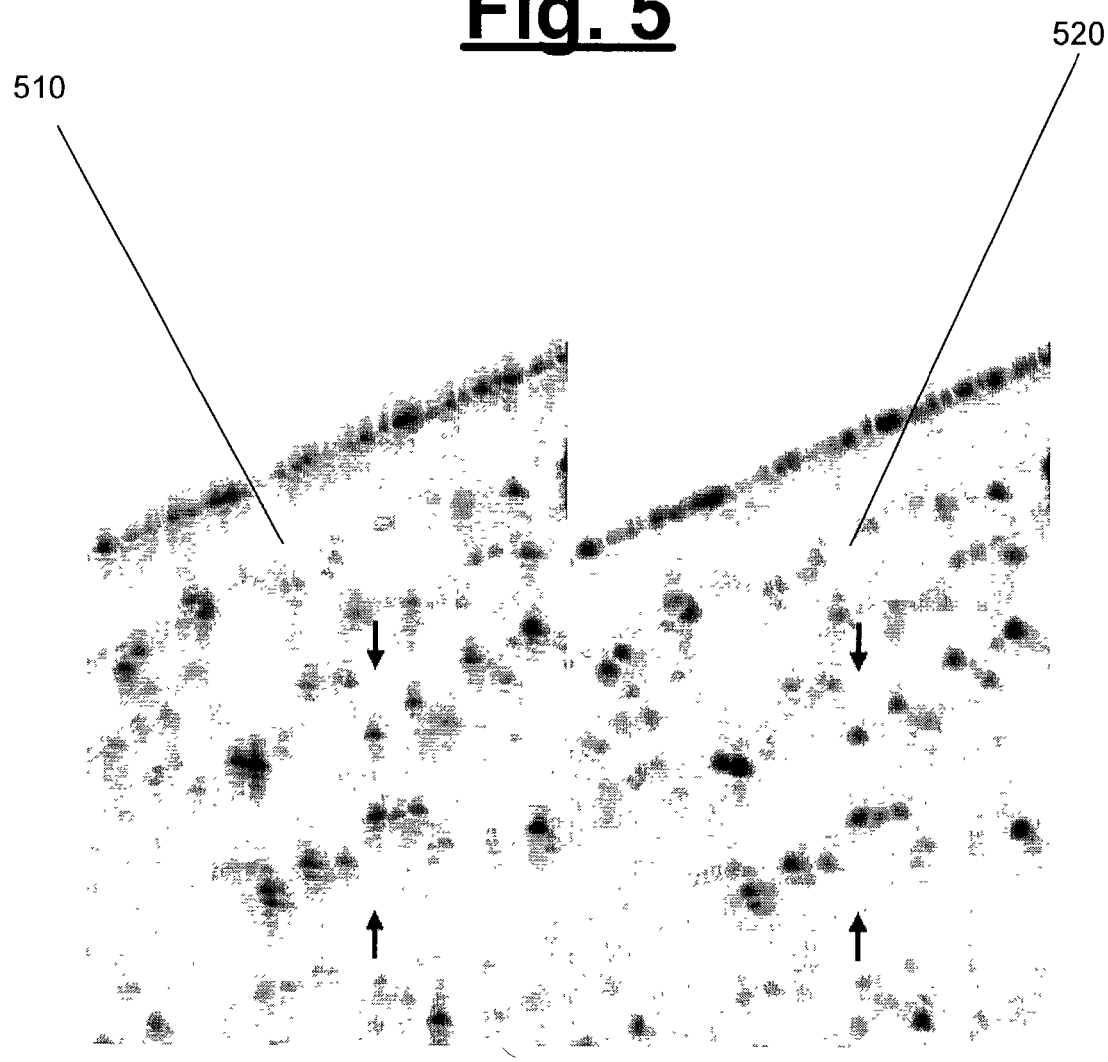
FIG. 5 is an image of an exemplary onion cell based on the unmodified coherence envelope of FIG. 4, and an image of the onion cell based on the modified coherence envelope of FIG. 4.

FIG. 5 depicts an exemplary side-by-side illustration of uncorrected images 510, and spectrally shaped images 520 after summing the six individual images to reduce background noise. Both exemplary images illustrated in FIG. 5 are gray scale coded over a dynamic range of 40 dB (e.g., from maximum signal in the image to the noise level) and cropped to 600×480 µm (W×D). The image can be magnified in the depth direction by a factor of 2 to increase the visibility of the side lobes.

Figure 6:
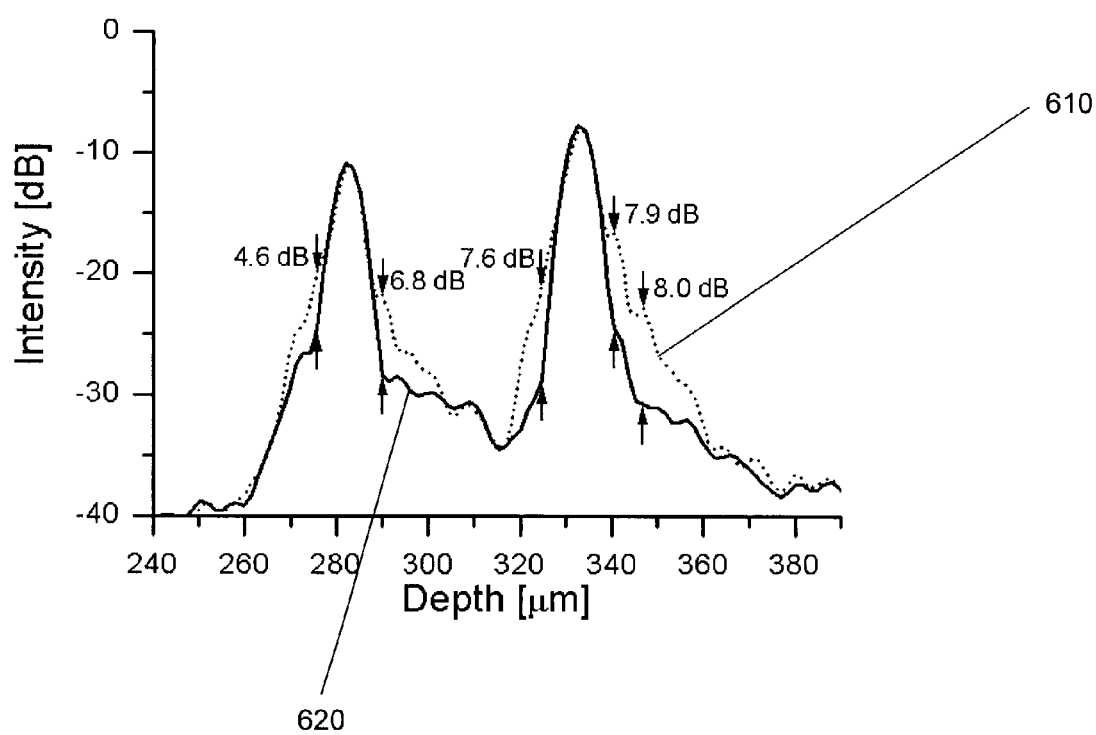
FIG. 6 is a graph depicting a depth profile of the image based on the unmodified coherence envelope of FIG. 4, and a depth profile of the image based on the modified coherence envelope of FIG. 4.

The effects of side lobes on image quality is clearly visible in the uncorrected image. Throughout such image, spurious structures are visible around strongly scattering objects that correspond to the positions of the side lobes. The spectrally shaped image shows a significant reduction in the presence of these spurious structures. FIG. 6 shows exemplary single depth profiles 610 and 620 averaged over 4 A-lines before and after spectral correction, and the achieved side lobe reduction in between the position of the arrows of FIG. 5, respectively. The increase in the noise floor determined by averaging the signal in the air above the sample surface can preferably be only approximately 0.9 dB.

The increase in the noise floor can be estimated as follows. The intensity $I(z)$ reflected from the sample arm is preferably proportional to the square of the interferometric intensity $R(z)$ in Equation 1. The curve $SC(k)$ gives a multiplication factor for each Fourier component $R(k)$, which consists of a signal $R_s(k)$ and a noise $R_n(k)$ contribution. Using Parsefal's theorem, the average noise level $<R_n^2(z)>$ is equal to $<|R_n(k)|^2>$, where angular brackets denote averaging. Thus, the increase in the noise level is given by $\int SC^2(k)|R_n(k)|^2 dk / \int |R_n(k)|^2 dk$. Assuming a white noise spectrum, this noise level can be reduced to $10*\log <SC^2(k)>$ in dB. For the glass slide, it is possible to calculate a value of 8.65 dB, which corresponds well to a measured value of 8.5 dB, and for the image which have been calculated—a value of 0.97 dB, which corresponds to a measured value of 0.9 dB. The 8.5 dB increase in the noise level for the glass slide is mainly due to the large value of $SC(k)$ between 855 and 867 nm (see FIG. 3).

The peak values of the coherence envelopes are proportional to $\int |R_s(k)| dk$. Equal peak heights before and after spectral shaping can be maintained if $\int |R_s(k)| dk = \int SC(k)|R_s(k)| dk$. This condition can be approximately satisfied by using the zero'th moment of the spectral density $|R(k)|$ as the zero'th moment for the Gaussian fit. This results in virtually equal values of the coherence peaks for uncorrected and spectrally filtered depth profiles, as can be observed in FIGS. 3 and 4. Alternatively, an estimate of the noise can be subtracted from $|R(k)|$ to obtain a possibly better estimate of $|R_s(k)|$.

In the previous example, the first and second moments as determined from the Glass slide were used as parameters for the Gaussian fit to the spectral density obtained from the onion sample. However, as shown in FIG. 3, it is possible to obtain the first and second moment directly from the spectral density of the onion sample. Thus, it may not be necessary to obtain an autocorrelation function (e.g., a point response). A good estimate of the source spectrum can be obtained from the cross correlation function by averaging the spectral density $|S(k)|$ over many A-lines. To improve the accuracy of the zero'th, first and second moment, the noise component to $|S(k)|$ could be subtracted first. The noise component can be estimated by assuming a white noise spectrum, and subtracting a constant from the spectral density $|S(k)|$ with, for example, the preference that $|S(k)|$-constant is not negative. Alternatively, the noise component could be estimated by performing a measurement of $R(z)$ with the sample arm blocked, thus obtaining an estimate of the sum of the electronic noise spectrum, shot noise spectrum, source noise spectrum and other noise sources. The optimal choice of the first and second moment for the target Gaussian in a particular measurement could also be determined by selecting the maximum allowable increase in the noise floor. It should also be understood that in the example, the Gaussian function can be replaced by any other type of function that is advantageous for an image quality improvement and/or side lobe reduction.

One of the benefits of the present invention is that the spectral shaping procedure enables the use of non-Gaussian source spectra in the OCT. A quantitative analysis of the accompanying signal to noise penalty can also be implemented.

II. Dispersion Compensation

Phase sensitive digital signal processing techniques can be used to remove a broadening of the response function due to a Group Delay Dispersion ("GDD") in post-processing. It is possible for the phase sensitive digital signal processing to also compensate for higher order dispersion terms in unbalanced OCT systems. GDD introduces a linear dependence of the phase derivative on frequency (or wavelength). Third and fourth order dispersions would likely manifest themselves as quadratic and cubic dependencies, respectively. Ultimately, depth dependent sample dispersion could be corrected for.

Figure 10:
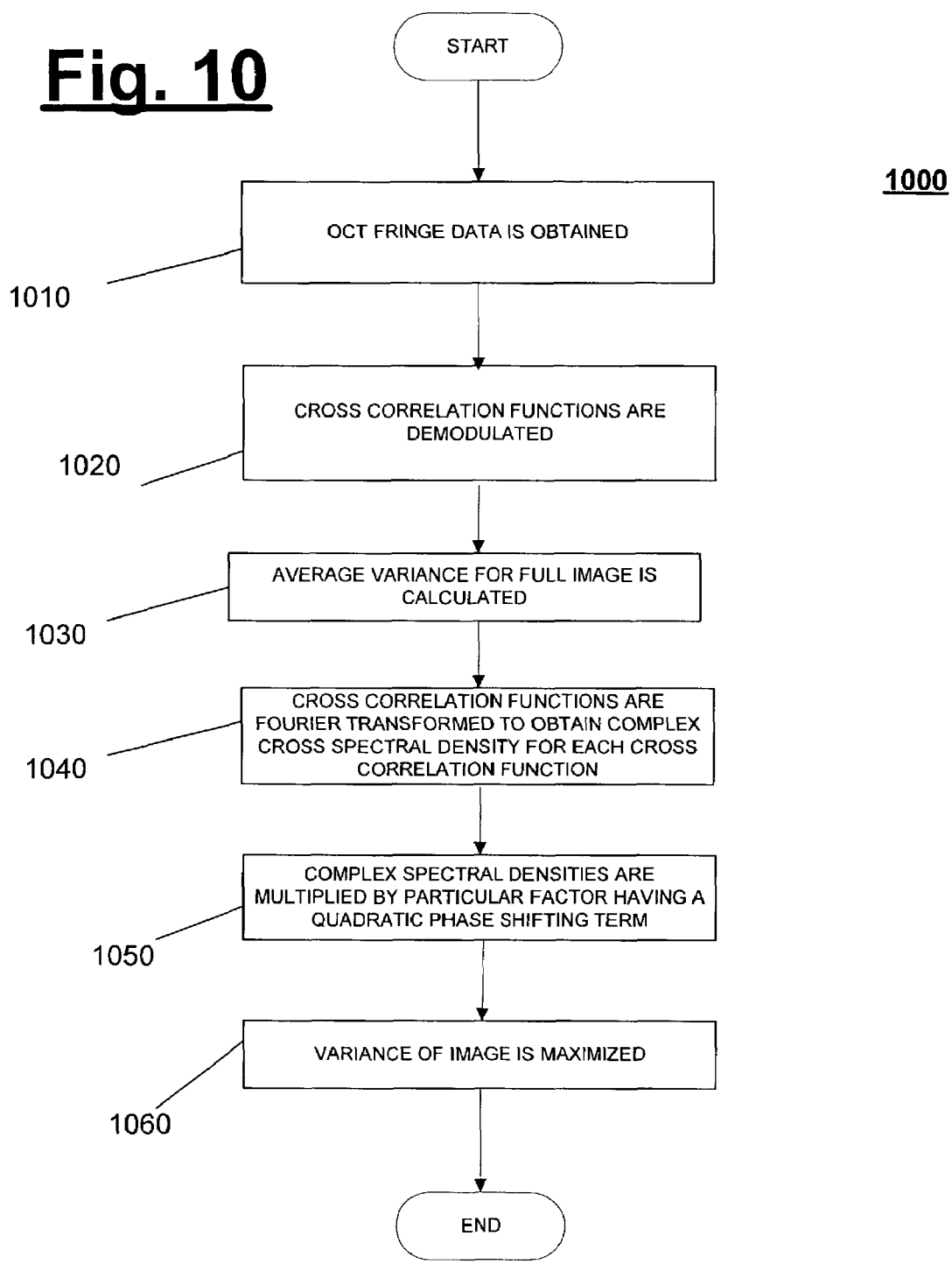
FIG. 10 is a flow diagram of a second exemplary embodiment of a method according to the present invention for imaging the sample.

Referring to FIG. 10, a second exemplary embodiment of a method 1000 for compensating for dispersion of light in order to image the sample 140 is depicted. In step 1010, OCT fringe data for an image is obtained. This step may consist of obtaining a plurality of cross correlation functions $R(z)$ at different sample locations. In step 1020, the depth profile $R(z)$ is demodulated to obtain the structural profile $I(z)$. In step 1030, the average variance $<I^2(z)>$ is calculated for the full image (e.g., all depth profiles). In step 1040, each of the cross correlation functions are Fourier-transformed to obtain complex spectral density: $R(z) \rightarrow S(k)$. In step 1050, each component of the complex spectral density $S(k)$ is multiplied by $e^{i\phi(k)}$, i.e., $\tilde{S}(k)=S(k)e^{i\phi(k)}$, where $\phi(k)$ is given by $\phi(k)=(k-k_0)^2 * a$, $k_0$ is the center wave-vector of the spectrum, and $a$ defines a quadratic phase shift that is introduced to compensate for GDD present in the recorded cross correlation function $R(z)$. Also, $a$ is a variable that will be optimized in an iterative procedure. In step 1050, an inverse Fourier transform is performed on $\tilde{S}(k)$, $\tilde{S}(k) \rightarrow \tilde{R}(z)$, and the GDD corrected depth profile $\tilde{R}(z)$ is demodulated to obtain the structural profile $I(z)$, in which $I(z)$ proportional to the intensity reflected from the sample arm.

In step 1060, the average variance $<I^2(z)>$ is calculated for the full image (all depth profiles). In step 1060, the variance $<I^2(z)>$ is maximized through an iterative procedure by varying a (e.g., by performing steps 1040 and 1050 a plurality of times). When a maximum is found for a, the optimal GDD correction has likely been found. It will be understood by those of ordinary skill in the art that this procedure can be repeated for a third order dispersion (TOD) and higher order dispersion by multiplying each component of the complex spectral density $S(k)$ by $e^{i\phi(k)}$, i.e., $\tilde{S}(k)=S(k)e^{i\phi(k)}$, where $\phi(k)$ is given by $\phi(k)=(k-k_0)^3*b$, $k_0$ is the center wave-vector of the spectrum, and b defines a cubic phase shift that is introduced to compensate for TOD present in the recorded cross correlation function $R(z)$. Higher order corrections can be calculated by consecutive terms of a Taylor expansion of the phase $\phi(k)$ around $k=k_0$.

When the optimal compensation parameters are determined for a particular measurement environment (e.g., system configuration, target, application or patient), the correction can be applied immediately without the iterative procedure.

Figure 7:
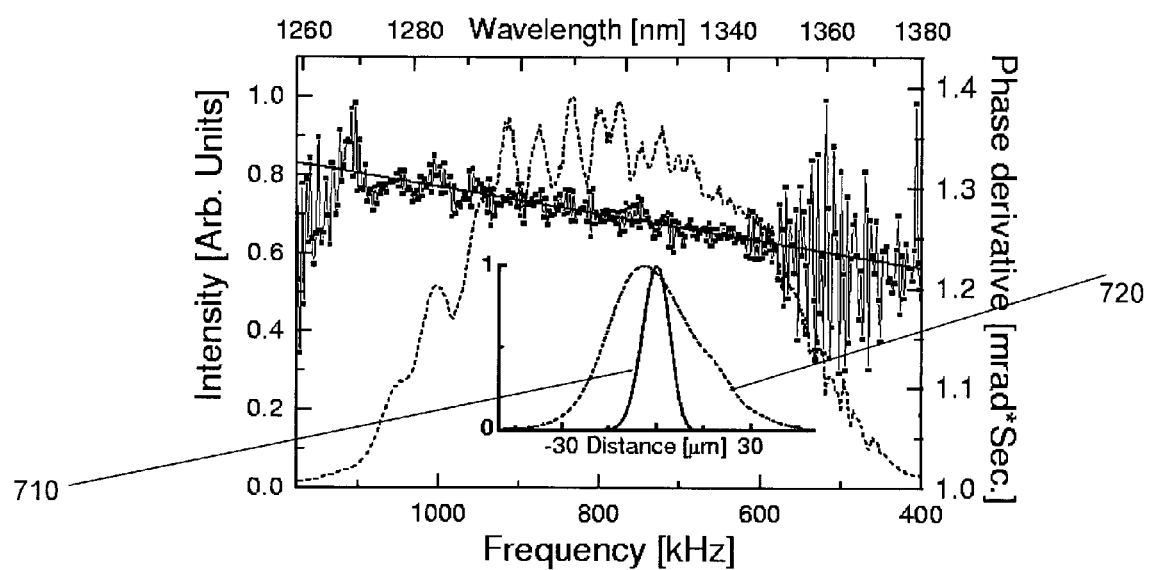
FIG. 7 is a graph of a spectrum and phase derivative of the source as a function of frequency, including an insert of an unmodified coherence envelope and a modified coherence envelope according to an exemplary embodiment of the present invention.

The GDD compensation can be demonstrated by experimentally introducing $4.4 \times 10^3$ fS$^2$ GDD in the reference arm. GDD can be measured by a Fourier transformation of the interferometric response to a single surface. The phase of each Fourier component can be calculated by taking the arc tangent of the ratio of imaginary and real parts. As shown in FIG. 7, the power spectrum and first derivative of the phase, averaged over 1000 depth profiles, can be provided as a function of frequency.

A linear fit to the first derivative of the phase may yield a slope of $1.36 \times 10^{-7}$ mrad s$^2$, corresponding to $4.7 \times 10^3$ fS$^2$ GDD. Correcting for this quadratic phase shift in the Fourier domain of the interferometric signal may preferably remove the GDD in each individual depth profile. The inset of FIG. 7 shows the coherence envelopes 710 and 720 of the response to a single surface before and after digital processing, respectively, averaged over 1000 depth profiles. The resulting coherence envelope 720 overlaps the coherence envelope 710 of a dispersion balanced system.

Figure 8:
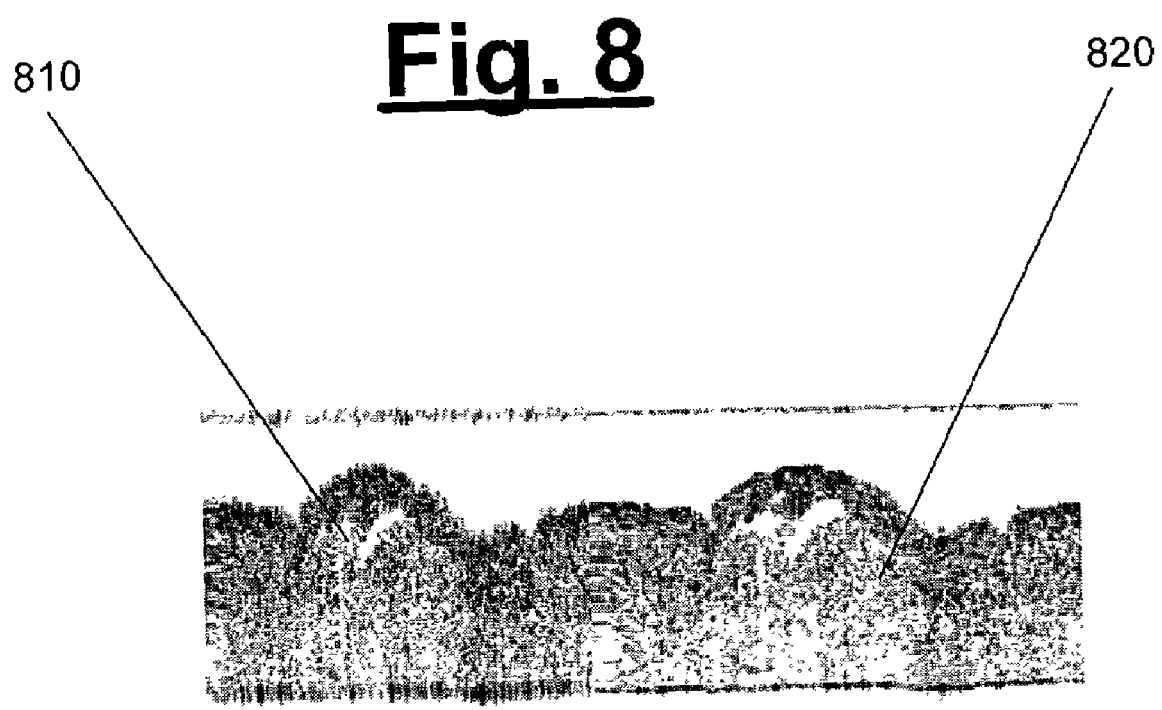
FIG. 8 is an image of an ex-vivo human skin graft based on the unmodified coherence envelope of FIG. 7, and an image of the ex vivo human skin graft based on the modified coherence envelope of FIG. 7.

To demonstrate that the GDD correction can be extended beyond the example of a single surface, a human skin graft can be imaged with an unbalanced GDD system. The left image 810 of FIG. 8 shows the effect of an unbalanced GDD, and the right image 820 of FIG. 8 shows the result of a digital GDD compensation on the same data set, where a prior knowledge on the amount of GDD in the system can preferably be used. Thus, the fit parameter a may be determined beforehand.

In the present example, a prior knowledge of the amount of GDD in the system was known. However, the GDD correction can be determined without the prior knowledge of the GDD imbalance in the system. The GDD preferably broadens the point response function. The intensity reflected from the sample arm $I(z)$ is proportional to the square of $R(z)$. This broadening of the response function $I(z)$ due to GDD reduces the variance $<I^2(z)>$. The variance of $<I^2(z)>$ likely does not change by introducing a quadratic or higher order phase shift due to the Parsefal's theorem. Thus, the variance $<I^2(z)>$ is a criterion to optimize the depth profile $I(z)$ by a compensation of a non-linear dispersion.

III. Fast Data Processing a. First Embodiment for Fast Data Processing

In an OCT system, the coherence function is preferably proportional to the real part of the Fourier transform of the source spectrum $S(k)$, $$R(\Delta z) \propto Re \int exp(i2k\Delta z) S(k) dk,$$

with $k=2\pi/\lambda$ being the free space wave number, and $\Delta z=z-z_i$ being the path length difference between reference and sample waves, respectively, for a scattering object located at $z_i$. $R(z)$ is the interference part of the signal detected at the photo detectors. The intensity $I(z)$ back-scattered from the sample arm can be proportional to the square of $R(z)$, $I(z) \propto R^2(z)$. For a Gaussian source with spectral full width at half maximum (FWHM) $\Delta\lambda$ centered at $\lambda_0$, the FWHM of the coherence envelope is given by $$l_c = \frac{2\lambda_0^2 \ln 2}{\pi \Delta \lambda}.$$

For a series of scattering objects positioned at the location $z_i$, the coherence function is given by;

$$R(z) \propto \sum_i Re \int exp(i2k(z-z_i)) S(k) dk,$$

where $R(z)$ is the measured interference part of the OCT signal. For the Gaussian source spectrum, the signal can be characterized as a set of Gaussians centered at the locations $z_i$, modulated with a carrier frequency given by the wave vector k at the central wavelength of the source $k_0=2\pi/\lambda_0$. The sine and cosine components of the signal carrier can be extracted by multiplying $R(z)$ with the sine and cosine term, respectively, and averaging over a single cycle of the oscillation.

The equations $R(z)\sin(2k_0z)$ and $R(z)\cos(2k_0z)$, averaged over an interval $\Delta z=\pi k_0$ or fractions or multiples thereof, can be used for the above. This can be written as $R(z) \exp(i2k_0z)$, with the real part and the complex part corresponding to the cosine and sine term, respectively.

Defining the Fourier transform as, e.g., $f(k)=\vec{F}[f(x)]=\sqrt{1/2\pi}\int f(x)\exp(ikx)dx$, and the inverse transform as, e.g., $f(x)=\vec{F}[f(k)]=\sqrt{1/2\pi}\int f(x)\exp(-ikx)dx$, the Fourier transform of $f(x)g(x)$ is given by $\vec{F}[f(x)g(x)]=\sqrt{1/2\pi}\int f(x)g(x)\exp(iqx) dx=[fg](q)$, with $[fg](q)=\sqrt{1/2\pi}\int f(q-k)g(k)dk$. Using the equation $f(x)g(x)=\vec{F}[\vec{F}[f(x)g(x)]]=\vec{F}[[fg](q)]$ and $\vec{F}[\exp(i2k_0z]=\sqrt{1/2\pi}\delta(2k_0+k)$, it is possible to express:

$$R(z)exp(i2k_0z) = \vec{F}[\int R(q-k)\delta(2k_0+k)dk] = \vec{F}[R(q-2k_0)].$$

Thus, the quantities of interest can be given by the real and imaginary part of the inverse Fourier transform of the shifted Fourier spectrum $R(k)$ of the original signal $R(x)$:

$$R(z)\cos(2k_0z) = Re[\vec{F}[R(q-2k_0)]]$$

$$R(z)\sin(2k_0z) = Im[\vec{F}[R(q-2k_0)]]$$

By reducing the size of the inverse transform to the signal band (which is now centered at around zero), the inverse ransform $\vec{F}[R(q-2k_0)]$ preferably results in a reduced size, in which the signal is averaged over a number of points proportional to the reduction of the size of the Fourier spectrum. An example of a signal band is shown in FIGS. 3 and 7.

Spectral filtering can be implemented seamlessly by using the above-described technique according to the present invention. The Fourier spectrum is available before shifting and the inverse transform. The spectral filter can be applied in the Fourier domain before the inverse Fourier transform is applied.

The sine and cosine components of the OCT signal as a function of z can be used to calculate the Stokes parameters (e.g., as described in U.S. Pat. No. 6,208,415, the entire disclosure of which is incorporated herein by reference) and the phase at each point z by taking the arc-tangent of the ratio of the sine and cosine components. The phase can be used to calculate the Doppler shift between the adjacent A-lines.

In summary, the above-described method and system for processing the OCT signals can extract the intensity and the phase at each location z in the OCT signal $R(z)$ in an efficient manner, perform a FFT on the signal, and also implement an inverse FFT on a frequency shifted and reduced data set that immediately provides the sine and cosine components of the signal at location z, averaged over a section $\Delta z$ (determined by the amount the original FFT is reduced). These method and system are computationally efficient due to the reduced size of the inverse transform. They render, e.g., immediately the cosine and sine components of the signal for further processing. The method and system of the present invention allow for spectral correction and dispersion compensation in an efficient manner by applying the correction and compensation on the data set in the Fourier domain.

Figure 11:
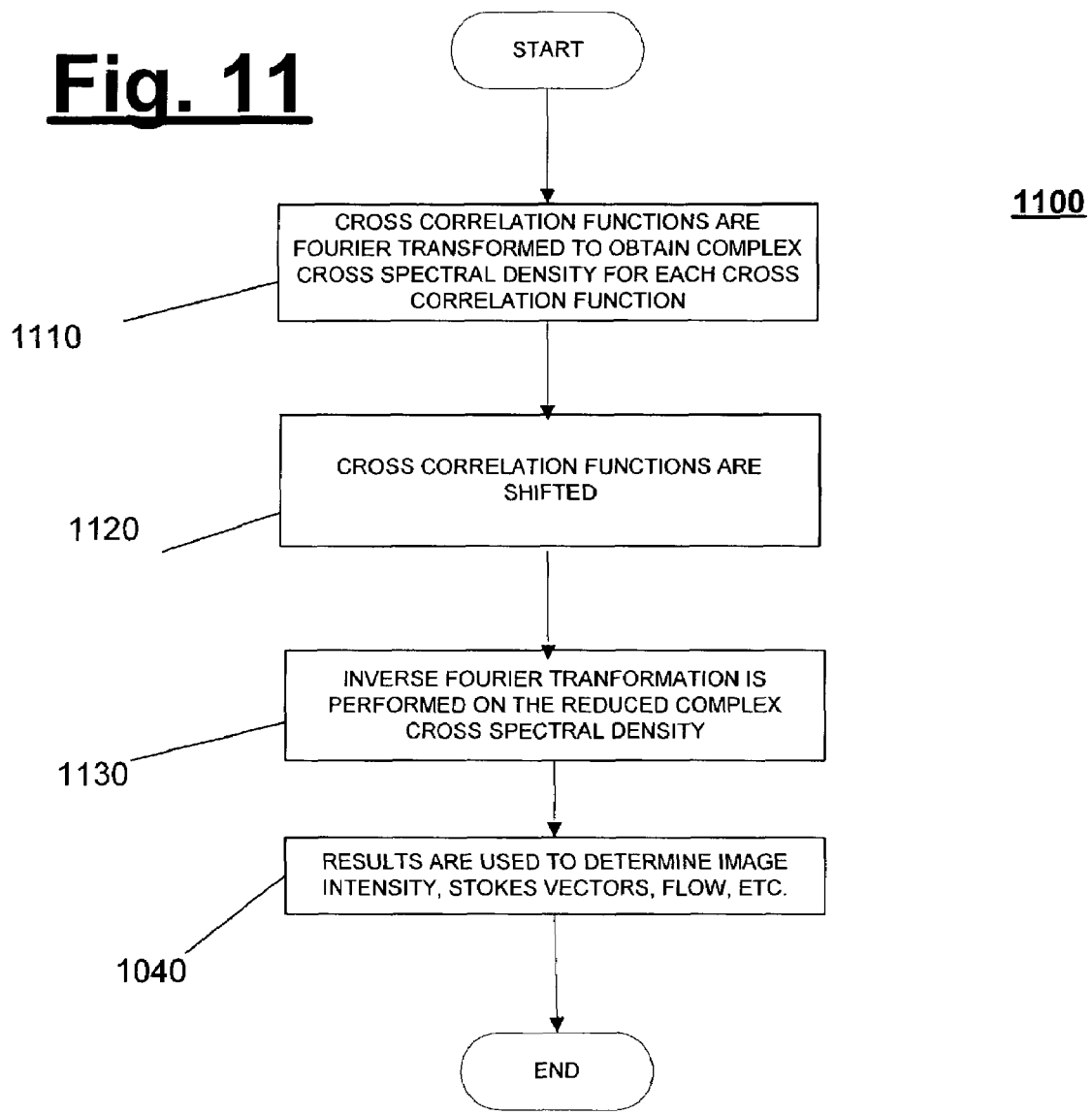
FIG. 11 is a flow diagram of a third exemplary embodiment of a method according to the present invention for imaging the sample.

Referring to FIG. 11, a third exemplary embodiment of a method 1100 according to the present invention for reducing a bandwidth range over which Fourier transforms and inverse Fourier transforms are performed by the software program 195 to image the sample 140 is depicted. In step 1110, the cross correlation functions are Fourier-transformed to obtain a complex cross spectral density $R(z) \rightarrow S(k)$ for each cross correlation function. In step 1120, each complex cross spectral density $S(k) \rightarrow S(k-2k_0)$ is shifted. In step 1130, an inverse Fourier transform is performed on the reduced complex cross spectral density $S(k-2k_0)$. The cosine and sine components at each location z are given by the real and complex part of the inverse Fourier transform. In step 1140, the results are used to calculate the intensity image, stokes vectors and flow.

b. Second Embodiment for Fast Data Processing

As described above, the equations for signals $R(z)\sin(2k_0z)$ and $R(z)\cos(2k_0z)$ can be averaged over an interval $\Delta z=\pi k_0$, or fractions or fractional multiples thereof. These signals can be obtained in a fast manner by multiplying the real fringe pattern $R(z)$ by $R(z)\exp(i2k_0z)$, and averaging the signal over an interval that corresponds to the desired pass band for the signal. The real and imaginary parts of the averaged signal preferably correspond to the cosine and sin terms, respectively, with the averaged signal being the desired signal. Due to the averaging process, the data can be reduced in size by summing the data over the averaging interval into a single point. Thus, the data would likely be reduced in size by a factor equal or proportional to the length of the averaging interval. A variety of weight functions could be chosen for the averaging process. Since this convolution with the weight function in the real domain corresponds to a product in the Fourier domain, the weight function defines a pass band filter for the signal. This method does not provide access to the Fourier spectrum of the signal, which can be preferable to perform the spectral filtering or the dispersion compensation. A Fourier transform of the averaged and in-size reduced complex data set $R(z) \exp(i2k_0z)$ provide, likely immediately, the shifted Fourier spectrum Re $[\tilde{F}[R(q-2k_0)]]$.

Because the data set was reduced, this Fourier transform is implemented significantly faster than the Fourier transform of the original data set $R(z)$. The spectral filtering and/or the dispersion compensation can be applied to the Fourier spectrum as described earlier. Alternatively, the multiplication $R(z) \exp(i2k_0z)$ and averaging (e.g., pass band filtering) can be implemented in analog electronics before the A/D conversions to reduce the A/D conversion speed. The analog data is split into two signals, representing the real and imaginary part of $R(z) \exp(i2k_0z)$, respectively.

Figure 12:
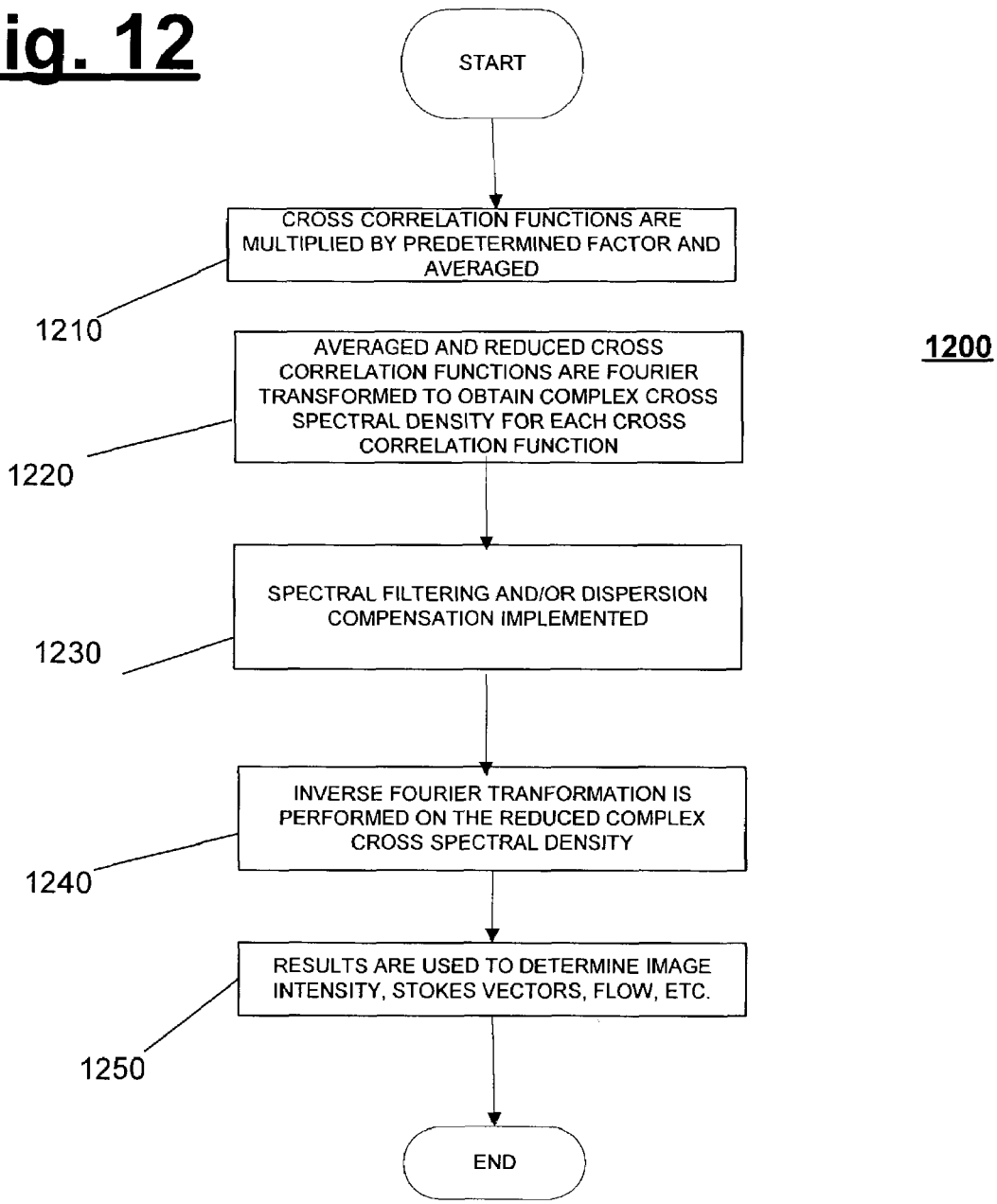
FIG. 12 is a flow diagram of a fourth exemplary embodiment of a method according to the present invention for imaging the sample.

Referring to FIG. 12, a fourth exemplary embodiment of the method 1200 for reducing a bandwidth range over which Fourier transforms and inverse Fourier transforms are performed by the software program 195 to image the sample 140 is depicted. In step 1210, $R(z)$ is multiplied by $\exp(ik0z)$ and averaged, and the data set is reduced. This can be done digitally or using analog electronics (e.g., using mixers and pass band filters). In step 1220, the complex averaged and reduced cross correlation functions are Fourier-transformed to obtain their corresponding complex cross spectral density, $R(z) \exp(i2k_0z) \rightarrow S(k-2k_0z)$. In step 1230, spectral filtering and/or dispersion compensation in Fourier domain is implemented. In step 1240, the inverse Fourier transform is performed on the reduced complex cross spectral density $S(k-2k_0)$. The cosine and sine components at each location z are given by the real and complex parts of the inverse Fourier transform. In step 1240, the results are used to calculate intensity image, stokes vectors and flow.

The above-described procedures can be performed using multiple detectors. For example, in a polarization sensitive system, both orthogonal polarization channels can be processed in this manner. Also, the signals of multiple channels using array detectors can be processed similarly. The above-described procedures can also be implemented as a function of depth in the tissue, allowing for depth dependent dispersion compensation and spectral correction. The exemplary calculation of stoke vectors is described in U.S. Pat. No. 6,208,415.

As described above, the three components (Spectral filtering, Dispersion compensation, and Fast Data Processing) can work independently from one another. One of the benefits of the method and system of the present invention can be obtained by merging the spectral filtering and dispersion compensation algorithms into the fast data processing algorithm, as shown in the flow diagram of FIG. 13. Both the spectral correction and the dispersion compensation are performed on Fourier transformed data sets, which can be calculated during the fast data processing algorithm.

Figure 13:
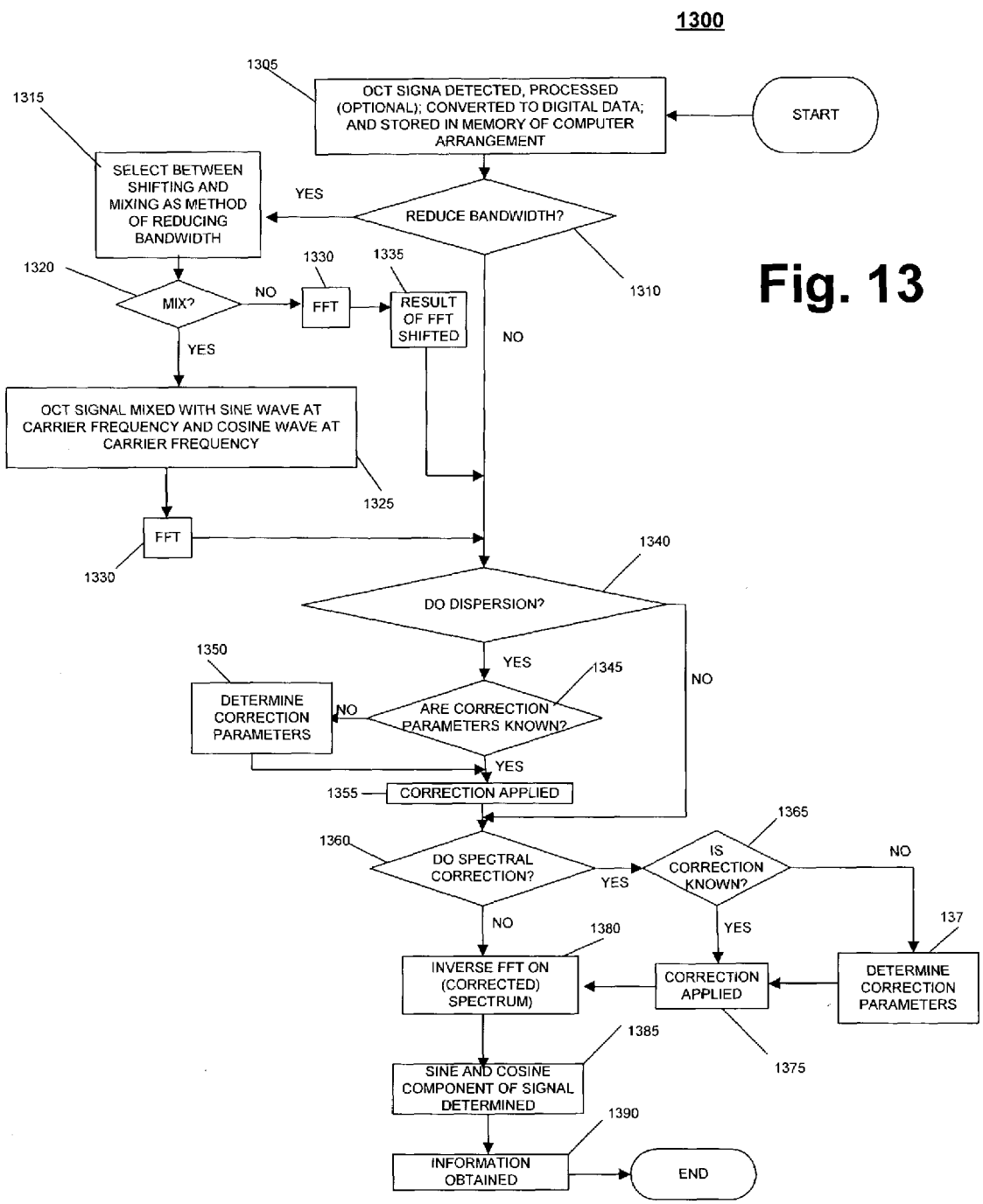
FIG. 13 is a flow diagram of a fifth exemplary embodiment of a method according to the present invention for imaging the sample.

Referring to FIG. 13, a fifth exemplary embodiment of the method 1300 for imaging the sample 140 is depicted. In step 1305, the optical OCT signal is detected by the detector 170, processed by the data processing unit 185 (which is optional), converted into digital data by the A/D converter 190, and stored in memory (not shown) of the computer arrangement 180. In step 1310, it is determined whether to reduce a bandwidth range over which Fourier transforms and inverse Fourier transforms are performed by the software program 195. If the bandwidth is not to be reduced, the method 1300 is directed to step 1340. Nevertheless, if the bandwidth is to be reduced, then in step 1315, the manner of the reduction is selected. Specifically, in step 1320, it is determined whether the signal is to be mixed with a sine wave at the carrier frequency and a cosine wave at the carrier frequency. If that is the case, in step 1325, the signal is mixed with the sine wave at the carrier frequency and the cosine wave at the carrier frequency, and in step 1330 the mixed signal may be processed by the FFT. Otherwise, in step 1330, the FFT is performed on the signal, and in step 1335 the spectrum (the result of the FFT) is shifted, and then the processing is forwarded to step 1340.

At this point, in step 1340, a decision is made whether to perform the dispersion compensation. If the dispersion compensation is not performed, the step 1360 is executed. Otherwise, if the correction parameters (e.g., the maximized quadratic phase shift) are known in step 1345 from a previous data set or run through the algorithm, the correction is applied in step 1355. If the correction parameters are not known in step 1345, an iterative procedure can be followed in step 1350 to obtain the quadratic correction to the phase as described with respect to FIG. 10. When all correction coefficients of interest for a particular measurement environment (e.g., system configuration, target, application or patient) are obtained (e.g., first order, second order, etc.), these coefficients are stored for future use with different data sets. Then, the correction is applied to this data set in step 1355.

At this point, in step 1360, a decision is made as to whether to perform a spectral correction. If the spectral correction is not performed, the method jumps to step 1380. However, if spectral correction is performed, and the correction curve is known in step 1365 from a previous data set or executed using the algorithm/technique, the spectral correction is applied in step 1375. Nevertheless, if the correction curve is not known in step 1365, a procedure is directed to step 1370 to obtain the spectral correction curve as described with respect to FIG. 9. Then, the spectral correction is applied in step 1375. In step 1380, the spectrum or the corrected spectrum can be processed by an inverse FFT. From the inverse FFT, in step 1385, the cosine and sine components of the signal centered at the carrier frequency within the signal bandwidth are preferably obtained. These sine and cosine components can be used to calculate an intensity (structural) image, birefringence information or image, and flow information or image in step 1390. Moreover, it will be understood by those of ordinary skill in the art that in a modification of the method 1300, steps 1360 through 1380 can be performed before steps 1340 through 1355.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or/practice of the invention disclosed herein. It is intended that the specification and the described examples are considered as exemplary only, with the true scope and spirit of the invention indicated by the following claims.

What is claimed is:

1. A method for obtaining information regarding a sample, comprising the steps of:
   receiving a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and
   determining a third cross spectral density which is at least approximately an average of the first cross spectral density and the second cross spectral density for imaging the sample.

2. The method of claim 1, further comprising the step of determining a particular width of a Gaussian spectra of a source of associated with the first combination and the second combination based on the third cross spectral density.

3. The method of claim 2, wherein the determining step comprises the substeps of:
   determining an area of the third cross spectral density;
   determining an average amplitude of the third cross spectral density; and
   determining a width of the third cross spectral density, wherein the particular width is based on the area, the average amplitude, and the width of the third cross spectral density.

4. The method of claim 2, further comprising the steps of determining a correction curve based on a ratio between the Gaussian spectra and the third cross spectral density;
   modifying the first cross spectral density as a function of the correction curve; and
   modifying the second cross spectral density as a function of the correction curve.

5. The method of claim 4, wherein the step of modifying the first cross spectral density comprises the substep of multiplying the first cross spectral density by the correction curve to obtain a first modified cross spectral density, and wherein the step of modifying the second complex cross spectral density comprises the substep of multiplying the second cross spectral density by the correction curve to obtain a second modified complex cross spectral density.

6. The method of claim 5, further comprising the steps of:
   transforming the first modified cross spectral density into a first modified cross correlation function;
   transforming the second modified cross spectral density into a second modified cross correlation function; and
   determining a coherence function envelope of the sample based on the first modified cross correlation function and the second modified cross correlation function.

7. The method of claim 1, wherein the first cross spectral density is transformed from a first cross correlation function, and the second cross spectral density is transformed from a second cross correlation function.

8. The method of claim 1, wherein at least one of the first cross spectral density and the second cross spectral density is complex.

9. A method for obtaining information regarding a sample, comprising the steps of:
   receiving a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and determining a particular width of a Gaussian spectra of a source associated with the first combination and the second combination based on a third cross spectral density which is at least partially based on the first cross spectral density and the second cross spectral density, wherein the particular width is used for imaging the sample.

10. A method for obtaining information regarding a sample, comprising the steps of:

receiving a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and modifying the first cross spectral density to implement a phase shift of the first cross spectral density.

11. The method of claim 10, further comprising the step of modifying the second cross spectral density to implement a phase shift of the second cross spectral density.

12. The method of claim 10, further comprising the step of generating an image of the sample based on the first cross spectral density and the second cross spectral density.

13. The method of claim 12, further comprising the step of determining an average variance associated with the image.

14. The method of claim 13, wherein the step of modifying the first cross spectral density comprises the substep of multiplying the first cross spectral density by a predetermined factor to obtain a first modified cross spectral density, and wherein the predetermined factor includes a particular quadratic phase shifting term.

15. The method of claim 14, further comprising the steps of:

generating a modified image of the sample based on at least the first modified cross spectral density; and determining an average variance associated with the modified image.

16. The method of claim 15, further comprising the steps of:

modifying the particular quadratic phase shifting term to obtain a modified predetermined factor;

multiplying the first cross spectral density by the modified predetermined factor to obtain a second modified cross spectral density;

generating a further modified image of the sample based on at least the second modified cross spectral density; and determining an average variance associated with the further modified image.

17. A method for obtaining information regarding a sample, comprising the steps of:

receiving a first combination of light and a second combination of light, wherein a first cross correlation function is associated with the first combination and a second cross correlation function is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination;

modifying the first cross correlation function to obtain a modified cross correlation function;

determining an average of the modified cross correlation function over a first electronic receiver frequency range which is different than a second electronic receiver frequency range of the first cross correlation function; and transforming the first modified cross correlation function into a first cross spectral density.

18. The method of claim 17, further comprising the steps of:

modifying the second cross correlation function to obtain a further modified cross correlation function;

determining an average of the further cross correlation function over the first frequency range; and transforming the further cross correlation function into a second cross spectral density.

19. The method of claim 18, further comprising the step of determining a third complex cross spectral density which is at least approximately an average of the first cross spectral density and the second cross spectral density.

20. The method of claim 19, further comprising the step of determining a particular width of a Gaussian spectra of a source associated with the first combination and the second combination based on the third cross spectral density.

21. The method of claim 20, wherein the determining step comprises the substeps of:

determining an area of the third cross spectral density;

determining an average amplitude of the third cross spectral density; and determining a width of the third cross spectral density, wherein the particular width is based on the area, the average amplitude, and the width of the third cross spectral density.

22. The method of claim 20, further comprising the steps of determining a correction curve based on a ratio between the Gaussian spectra and the third cross spectral density;

modifying the first cross spectral density as a function of the correction curve; and modifying the second cross spectral density as a function of the correction curve.

23. The method of claim 22, wherein the step of modifying the first cross spectral density comprises the substep of multiplying the first cross spectral density by the correction curve to obtain a first modified cross spectral density, and wherein the step of modifying the second cross spectral density comprises the substep of multiplying the second cross spectral density by the correction curve to obtain a second modified cross spectral density.

24. The method of claim 23, further comprising the steps of:

transforming the first modified cross spectral density into a third modified cross correlation function;

transforming the second modified cross spectral density into a fourth modified cross correlation function; and determining a coherence function envelope of the sample based on the third modified cross correlation function and the fourth modified cross correlation function.

25. The method of claim 18, further comprising the step of modifying the first cross spectral density to implement a phase shift of the first cross spectral density.

26. The method of claim 25, further comprising the step of modifying the second cross spectral density to implement a phase shift of the second cross spectral density.

27. The method of claim 25, further comprising the step of generating an image of the sample based on the modified cross correlation function and the further modified cross correlation function.

28. The method of claim 27, further comprising the step of determining an average variance associated with the image, wherein the average variance associated with the image is used to determine an optimum phase correction.

29. The method of claim 28, wherein the modifying step comprises the substep of multiplying the first cross spectral density by a predetermined factor to obtain a first modified cross spectral density, wherein the predetermined factor includes a particular quadratic phase shifting term.

30. The method of claim 29, further comprising the steps of:
transforming the first modified cross spectral density into a third cross correlation function;
generating a modified image of the sample based on at least the third cross correlation function; and
determining an average variance associated with the modified image, wherein the average variance associated with the modified image is used to determine the optimum phase correction.

31. The method of claim 30, further comprising the steps of:
modifying the particular quadratic phase shifting term to obtain a modified predetermined factor;
multiplying the first cross spectral density by the modified predetermined factor to obtain a second modified cross spectral density;
transforming the second modified cross spectral density into a fourth cross correlation function;
generating a further modified image of the sample based on at least the fourth cross correlation function; and
determining an average variance associated with the further modified image, wherein the average variance associated with the further modified image is used to determine the optimum phase correction.

32. A method for obtaining information regarding a sample, comprising the steps of:
receiving a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and
modifying an electrical receiver frequency range of the first cross spectral density from a first frequency range to a second frequency range.

33. The method of claim 32, further comprising the steps of:
modifying a frequency range of the second cross spectral density from the first frequency range to the second frequency range.

34. The method of claim 33, wherein the first frequency range is between about 600 Hz and about 1 kHz, and wherein the second frequency range is between about −200 Hz and about 200 Hz.

35. An system for obtaining information regarding a sample, comprising:
a computer arrangement, which when executing a software program, is configured to:
receive a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and
determine a third cross spectral density which is at least approximately an average of the first cross spectral density and the second cross spectral density.

36. The system of claim 35, wherein the computer arrangement is further configured to determine a particular width of a Gaussian spectra of a source of the first combination and the second combination based on the third cross spectral density.

37. The system of claim 36, wherein the computer arrangement is further configured to:
determine an area of the third cross spectral density,
determine an average amplitude of the third cross spectral density, and
determine a width of the third cross spectral density, wherein the computer arrangement determines the particular width based on the area, the average amplitude, and the width of the third cross spectral density.

38. The system of claim 36, wherein the computer arrangement is further configured to:
determine a correction curve based on a ratio between the Gaussian spectra and the third cross spectral density,
modify the first cross spectral density as a function of the correction curve, and
modify the second cross spectral density as a function of the correction curve.

39. The system of claim 38, wherein, in order to modify the first cross spectral density comprises, the computer arrangement is configured to multiply the first cross spectral density by the correction curve to obtain a first modified cross spectral density, and wherein, in order to modify the second cross spectral density, the computer arrangement is configured to multiply the second cross spectral density by the correction curve to obtain a second modified cross spectral density.

40. The system of claim 39, wherein the computer arrangement is further configured to:
transform the first modified cross spectral density into a first modified cross correlation function,
transform the second modified cross spectral density into a second modified cross correlation function, and
determine a coherence function envelope of the sample based on the first modified cross correlation function and the second modified cross correlation function.

41. The system of claim 35, wherein the first cross spectral density is transformed from a first cross correlation function, and the second cross spectral density is transformed from a second cross correlation function.

42. The system of claim 35, wherein at least one of the first cross spectral density and the second cross spectral density is complex.

43. A system for obtaining information regarding a sample, comprising the steps of:
a computer arrangement, which when executing a software program, is configured to:
receive a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination; and
determine a particular width of a Gaussian spectra of a source associated with the first combination and the second combination based on a third cross spectral density which is at least partially based on the first cross spectral density and the second cross spectral density, wherein the particular width is used for imaging the sample.

44. A system for obtaining information regarding a sample, comprising:
a computer arrangement, which when executing a software program, is configured to:
receive a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination, and
modify the first cross spectral density to implement a phase shift of the first cross spectral density.

45. The system of claim 44, wherein the computer arrangement is further configured to modify the second cross spectral density to implement a phase shift of the second cross spectral density.

46. The system of claim 44, wherein the computer arrangement is further configured to generate an image of the sample based on the first cross correlation function and the second cross correlation function.

47. The system of claim 46, wherein the computer arrangement is further configured to determine an average variance associated with the image, wherein the average variance associated with the image is used to determine an optimum phase correction.

48. The system of claim 47, wherein the computer arrangement is configured to modify by multiplying the first cross spectral density by a predetermined factor to obtain a first modified cross spectral density, wherein the predetermined factor includes a particular quadratic phase shifting term.

49. The system of claim 48, wherein the computer arrangement is further configured to:
transform the first modified cross spectral density into a third cross correlation function,
generate a modified image of the sample based on at least the third cross correlation function, and
determine an average variance associated with the modified image, wherein the average variance associated with the modified image is used to determine the optimum phase correction.

50. The system of claim 49, wherein the computer arrangement is further configured to:
modify the particular quadratic phase shifting term to obtain a modified predetermined factor,
multiply the first cross spectral density by the modified predetermined factor to obtain a second modified cross spectral density,
transform the second modified cross spectral density into a fourth cross correlation function,
generate a further modified image of the sample based on at least the fourth cross correlation function, and
determine an average variance associated with the further modified image, wherein the average variance associated with the further modified image is used to determine the optimum phase correction.

51. A system for obtaining information regarding a sample, comprising:
a computer arrangement, which when executing a software program, is configured to:
receive a first combination of light and a second combination of light, wherein a first cross correlation function is associated with the first combination and a second cross correlation function is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination,
modify the first cross correlation function to obtain a modified cross correlation function,
determine an average of the modified cross correlation function over a first electronic receiver frequency range which is different than a second electronic receiver frequency range of the first cross correlation function, and
transform the modified cross correlation function into a cross spectral density.

52. The system of claim 51, wherein the computer arrangement is further configured to:
modify the second cross correlation function to obtain a further modified cross correlation function,
determine an average of the further modified cross correlation function over the first frequency range, and
transform the further modified cross correlation function into a further cross spectral density.

53. The system of claim 52, wherein the computer arrangement is further configured to determine a third cross spectral density which is at least approximately an average of the cross spectral density and the further cross spectral density.

54. The system of claim 53, wherein the computer arrangement is further configured to determine a particular width of a Gaussian spectra of a source of the first combination and the second combination based on the third cross spectral density.

55. The system of claim 54, wherein the computer arrangement is further configured to:
determine an area of the third cross spectral density, determine an average amplitude of the third cross spectral density, and determine a width of the third cross spectral density, wherein the particular width is based on the area, the average amplitude, and the width of the third cross spectral density.

56. The system of claim 54, wherein the computer arrangement is further configured to:

determine a correction curve based on a ratio between the Gaussian spectra and the third cross spectral density, modify the cross spectral density as a function of the correction curve, and modify the further cross spectral density as a function of the correction curve.

57. The system of claim 56, wherein the computer arrangement is configured to modify the cross spectral density by multiplying the cross spectral density by the correction curve to obtain modified cross spectral density, and wherein the computer arrangement is configured to modify the cross spectral density by multiplying the further cross spectral density by the correction curve to obtain a further modified cross spectral density.

58. The system of claim 57, wherein the computer arrangement is further configured to:

transform the modified cross spectral density into a third modified cross correlation function, transform the further modified cross spectral density into a fourth modified cross correlation function, and determine a coherence function envelope of the sample based on the third modified cross correlation function and the fourth modified cross correlation function.

59. The system of claim 52, wherein the computer arrangement is further configured to modify the first cross spectral density to implement a phase shift of the cross spectral density.

60. The system of claim 59, wherein the computer arrangement is further configured to modify the further cross spectral density to implement a phase shift of the further cross spectral density.

61. The system of claim 59, wherein the computer arrangement is further configured to generate an image of the sample based on the modified cross correlation function and the further modified cross correlation function.

62. The system of claim 61, wherein the computer arrangement is further configured to determine an average variance associated with the image, wherein the average variance associated with the image is used to determine an optimum phase correction.

63. The system of claim 62, wherein the computer arrangement is further configured to modify by multiplying the cross spectral density by a predetermined factor to obtain a modified cross spectral density, wherein the predetermined factor includes a particular quadratic phase shifting term.

64. The system of claim 63, wherein the computer arrangement is further configured to:

transform the modified cross spectral density into a third cross correlation function, generate a modified image of the sample based on at least the third cross correlation function, and determine an average variance associated with the modified image, wherein the average variance associated with the image is used to determine the optimum phase correction.

65. The system of claim 64, wherein the computer arrangement is further configured to:

modify the particular quadratic phase shifting term to obtain a modified predetermined factor, multiply the first cross spectral density by the modified predetermined factor to obtain the further modified cross spectral density, transform the further modified cross spectral density into a fourth cross correlation function, generate a further modified image of the sample based on at least the fourth cross correlation function, and determine an average variance associated with the further modified image, wherein the average variance associated with the further modified image is used to determine the optimum phase correction.

66. A system for obtaining information regarding a sample, comprising:

a computer arrangement, which when executing a software program, is configured to:

receive a first combination of light and a second combination of light, wherein a first cross spectral density is associated with the first combination and a second cross spectral density is associated with the second combination, wherein each of the first and the second combinations includes a first portion of light which is received from a reference arrangement and a second portion of light which is received from the sample, and wherein a first relative position of the sample associated with the first combination is different than a second relative position of the sample associated with the second combination, and modify an electrical receiver frequency range of the first cross spectral density from a first frequency range to a second frequency range.

67. The system of claim 66, wherein the computer arrangement is further adapted to:

modify a frequency range of the second cross spectral density from the first frequency range to the second frequency range.

68. The system of claim 67, wherein the first frequency range is between about 600 Hz and about 1 kHz, and wherein the second frequency range is between about −200 Hz and about 200 Hz.

69. A method for determining data associated with at least one portion of a sample, comprising:

a) obtaining at least one spectral density associated with at least one first section of light from the at least one portion of the sample and at least one second section of light from a reference;

b) modifying the at least one spectral density using a particular criteria or function which is at least one of predetermined and determinable; and c) generating an image for the at least one portion of the sample based on the at least one modified spectral density.

70. The method according to claim 69, wherein the particular criteria or function is a spectral correction function which is intended to be used to modify an amplitude of the at least one spectral density.

71. The method according to claim 69, wherein the particular criteria or function is a phase function intended to implement a variable phase shift of the at least one spectral density as a function of at least one of a wavelength and a wave vector, and wherein the phase function is intended to be used to modify only a phase of the at least one spectral density, without modifying the amplitude thereof.

72. The method according to claim 71, further comprising:

d) iteratively modifying the phase function so as to increase a variance of the image.

73. The method according to claim 69, wherein the at least one spectral density is a plurality of spectral densities, and wherein the at least one modified spectral density is a plurality of modified spectral densities.

74. An imaging system for imaging a sample, comprising:
a computer arrangement, which when executing a software program, is configured to:
 a) obtain at least one spectral density associated with at least one first section of light from the at least one portion of the sample and at least one second section of light from a reference,
 b) modify the at least one spectral density using a particular criteria or function which is at least one of predetermined and determinable, and
 c) generate an image for the at least one portion of the sample based on the at least one modified spectral density.

75. The system according to claim 74, wherein the particular criteria or function is a spectral correction function which is intended to be used to modify an amplitude of the at least one spectral density.

76. The system according to claim 74, wherein the particular criteria or function is a phase function intended to implement a variable phase shift of the at least one spectral density as a function of at least one of a wavelength and a wave vector, and wherein the phase function is intended to be used to modify only a phase of the at least one spectral density, without modifying the amplitude thereof.

77. The system according to claim 76, wherein the computer arrangement is further configured to:
 d) iteratively modifying the phase function so as to increase a variance of the image.

78. The system according to claim 74, wherein the at least one spectral density is a plurality of spectral densities, and wherein the at least one modified spectral density is a plurality of modified spectral densities.

79. The system according to claim 78, wherein the particular criteria or function is approximately an average of the plurality of spectral densities.

* * * * *